(12) United States Patent
Schnittman

(10) Patent No.: US 9,836,653 B2
(45) Date of Patent: Dec. 5, 2017

(54) SYSTEMS AND METHODS FOR CAPTURING IMAGES AND ANNOTATING THE CAPTURED IMAGES WITH INFORMATION

(71) Applicant: iRobot Corporation, Bedford, MA (US)

(72) Inventor: Mark S. Schnittman, Somerville, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 15/473,327

(22) Filed: Mar. 29, 2017

(65) Prior Publication Data
US 2017/0206418 A1 Jul. 20, 2017

Related U.S. Application Data

(63) Continuation of application No. 14/572,712, filed on Dec. 16, 2014.

(51) Int. Cl.
*G06K 9/00* (2006.01)
*G06K 9/66* (2006.01)
(Continued)

(52) U.S. Cl.
CPC ........ *G06K 9/00671* (2013.01); *B25J 19/023* (2013.01); *G05D 1/0088* (2013.01); *G05D 1/0246* (2013.01); *G05D 1/0274* (2013.01); *G06K 9/66* (2013.01); *G06T 7/55* (2017.01); *G05D 2201/02* (2013.01); *Y10S 901/01* (2013.01); *Y10S 901/47* (2013.01)

(58) Field of Classification Search
None
See application file for complete search history.

(56) References Cited

U.S. PATENT DOCUMENTS 5,252,951 A 10/1993 Tannenbaum et al.
5,754,631 A 5/1998 Cave
(Continued)

FOREIGN PATENT DOCUMENTS

KR 10-2005-0087644 8/2005
KR 10-2011-0127946 11/2011

OTHER PUBLICATIONS

"Dr. Robot Tested at Hopkins" *Johns Hopkins Medicine* Public Release, 2 pages (Aug. 5, 2003).
(Continued)

*Primary Examiner* — Delomia L Gilliard
(74) *Attorney, Agent, or Firm* — Myers Bigel, P.A.

(57) ABSTRACT

The present teachings provide an autonomous mobile robot that includes a drive configured to maneuver the robot over a ground surface within an operating environment; a camera mounted on the robot having a field of view including the floor adjacent the mobile robot in the drive direction of the mobile robot; a frame buffer that stores image frames obtained by the camera while the mobile robot is driving; and a memory device configured to store a learned data set of a plurality of descriptors corresponding to pixel patches in image frames corresponding to portions of the operating environment and determined by mobile robot sensor events.

20 Claims, 15 Drawing Sheets

(51) Int. Cl.
*G06T 7/55* (2017.01)
*B25J 19/02* (2006.01)
*G05D 1/00* (2006.01)
*G05D 1/02* (2006.01)

(56) References Cited

U.S. PATENT DOCUMENTS

| | | | |
|---|---|---|---|
| 5,999,525 | A | 12/1999 | Krishnaswamy et al. |
| 6,335,927 | B1 | 1/2002 | Elliott et al. |
| 6,356,806 | B1 | 3/2002 | Grob et al. |
| 6,389,329 | B1 | 5/2002 | Colens |
| 6,532,404 | B2 | 3/2003 | Colens |
| 6,549,215 | B2 | 4/2003 | Jouppi |
| 6,554,433 | B1 | 4/2003 | Holler |
| 6,594,269 | B1 | 7/2003 | Polcyn |
| 6,594,844 | B2 | 7/2003 | Jones |
| 6,690,134 | B1 | 2/2004 | Jones et al. |
| 6,731,625 | B1 | 5/2004 | Eastep et al. |
| 6,754,181 | B1 | 6/2004 | Elliott et al. |
| 6,781,338 | B2 | 8/2004 | Jones et al. |
| 6,781,606 | B2 | 8/2004 | Jouppi et al. |
| 6,809,490 | B2 | 10/2004 | Jones et al. |
| 6,842,877 | B2 | 1/2005 | Robarts et al. |
| 6,909,708 | B1 | 6/2005 | Krishnaswamy et al. |
| 6,965,209 | B2 | 11/2005 | Jones et al. |
| 6,967,958 | B2 | 11/2005 | Ono et al. |
| 6,999,431 | B2 | 2/2006 | Rines |
| 7,145,898 | B1 | 12/2006 | Elliott |
| 7,155,308 | B2 | 12/2006 | Jones |
| 7,173,391 | B2 | 2/2007 | Jones et al. |
| 7,196,487 | B2 | 3/2007 | Jones et al. |
| 7,228,203 | B2 | 6/2007 | Koselka et al. |
| 7,283,893 | B2 | 10/2007 | Hara et al. |
| 7,286,474 | B2 | 10/2007 | Garg et al. |
| 7,388,343 | B2 | 6/2008 | Jones et al. |
| 7,389,156 | B2 | 6/2008 | Ziegler et al. |
| 7,428,216 | B2 | 9/2008 | Siddiqui et al. |
| 7,448,113 | B2 | 11/2008 | Jones et al. |
| 7,571,511 | B2 | 8/2009 | Jones et al. |
| 7,626,569 | B2 | 12/2009 | Lanier |
| 7,633,586 | B2 | 12/2009 | Winlow et al. |
| 7,636,982 | B2 | 12/2009 | Jones et al. |
| 7,720,572 | B2 | 5/2010 | Ziegler et al. |
| 7,761,954 | B2 | 7/2010 | Ziegler et al. |
| 7,805,220 | B2 | 9/2010 | Taylor et al. |
| 7,957,837 | B2 | 6/2011 | Ziegler et al. |
| 8,085,761 | B2 | 12/2011 | Elliott et al. |
| 8,195,333 | B2 | 6/2012 | Ziegler et al. |
| 8,265,793 | B2 | 9/2012 | Cross et al. |
| 8,565,920 | B2 | 10/2013 | Casey et al. |
| 8,761,935 | B2 | 6/2014 | Casey et al. |
| 2001/0021186 | A1 | 9/2001 | Ono et al. |
| 2002/0016649 | A1 | 2/2002 | Jones |
| 2002/0083462 | A1 | 6/2002 | Arnott |
| 2002/0114318 | A1 | 8/2002 | Rines |
| 2002/0120364 | A1 | 8/2002 | Colens |
| 2003/0003962 | A1 | 1/2003 | Vooi-Kia et al. |
| 2003/0025472 | A1 | 2/2003 | Jones et al. |
| 2004/0008627 | A1 | 1/2004 | Garg et al. |
| 2004/0020000 | A1 | 2/2004 | Jones |
| 2004/0037414 | A1 | 2/2004 | Pramodkumar et al. |
| 2004/0049877 | A1 | 3/2004 | Jones et al. |
| 2004/0083570 | A1 | 5/2004 | Song et al. |
| 2004/0114581 | A1 | 6/2004 | Hans et al. |
| 2004/0167716 | A1 | 8/2004 | Goncalves et al. |
| 2004/0187457 | A1 | 9/2004 | Colens |
| 2004/0204074 | A1 | 10/2004 | Desai |
| 2004/0207355 | A1 | 10/2004 | Jones et al. |
| 2005/0000543 | A1 | 1/2005 | Taylor et al. |
| 2005/0050090 | A1 | 3/2005 | Kawahata et al. |
| 2005/0057699 | A1 | 3/2005 | Bowser |
| 2005/0067994 | A1 | 3/2005 | Jones et al. |
| 2005/0192707 | A1 | 9/2005 | Park et al. |
| 2005/0204717 | A1 | 9/2005 | Colens |
| 2005/0286494 | A1 | 12/2005 | Hollatz et al. |
| 2006/0182029 | A1 | 8/2006 | Kealy et al. |
| 2007/0097963 | A1 | 5/2007 | Thermos et al. |
| 2007/0136405 | A1 | 6/2007 | Weinstein et al. |
| 2007/0192910 | A1 | 8/2007 | Vu et al. |
| 2007/0198128 | A1 | 8/2007 | Ziegler et al. |
| 2007/0199108 | A1 | 8/2007 | Angle et al. |
| 2007/0266508 | A1 | 11/2007 | Jones et al. |
| 2008/0025295 | A1 | 1/2008 | Elliott et al. |
| 2008/0084991 | A1 | 4/2008 | Chuang et al. |
| 2008/0140255 | A1 | 6/2008 | Ziegler et al. |
| 2008/0155768 | A1 | 7/2008 | Ziegler et al. |
| 2008/0184518 | A1 | 8/2008 | Taylor et al. |
| 2008/0307590 | A1 | 12/2008 | Jones et al. |
| 2009/0006555 | A1 | 1/2009 | Curran et al. |
| 2009/0129369 | A1 | 5/2009 | Turk et al. |
| 2009/0177323 | A1 | 7/2009 | Ziegler et al. |
| 2010/0049365 | A1 | 2/2010 | Jones et al. |
| 2010/0070078 | A1 | 3/2010 | Kong et al. |
| 2010/0257690 | A1 | 10/2010 | Jones et al. |
| 2010/0257691 | A1 | 10/2010 | Jones et al. |
| 2010/0263158 | A1 | 10/2010 | Jones et al. |
| 2010/0316287 | A1 | 12/2010 | Duong et al. |
| 2011/0172822 | A1 | 7/2011 | Ziegler et al. |
| 2012/0036659 | A1 | 2/2012 | Ziegler et al. |
| 2012/0103367 | A1 | 5/2012 | Tang |
| 2012/0242657 | A1 | 9/2012 | Asano et al. |
| 2013/0139193 | A1 | 5/2013 | Fan et al. |
| 2013/0169797 | A1 | 7/2013 | Min et al. |
| 2013/0226344 | A1 | 8/2013 | Wong et al. |
| 2014/0081523 | A1 | 3/2014 | Filla et al. |
| 2014/0088761 | A1 | 3/2014 | Shamlian et al. |
| 2014/0350839 | A1* | 11/2014 | Pack .................. G01C 21/30 701/409 |
| 2015/0166060 | A1 | 6/2015 | Smith |
| 2015/0324653 | A1* | 11/2015 | Xu .................. G06K 9/00838 348/148 |
| 2016/0103451 | A1 | 4/2016 | Vicenti |

OTHER PUBLICATIONS

International Search Report and Written Opinion for International Application PCT/US2013/065459, dated Jan. 20, 2014, 10 pages.

Nakajima et al. "A Multimedia Teleteaching System Using an Electronic Whiteboard for Two-Way Communication of Motion Videos and Chalkboards" *IEEE International Workshop on Robot and Human Communication* pp. 436-441 (1993).

Notification of Transmittal of the International Search Report and the Written Opinion of the International Searching Authority, or the Declaration, in corresponding PCT Application No. PCT/US15/65589, dated Mar. 7, 2016, 12 pages.

Salemi et al. "MILO: Personal Robot Platform" *IEEE International Conference on Intelligent Robots and Systems* 6 pages (Aug. 2005).

* cited by examiner

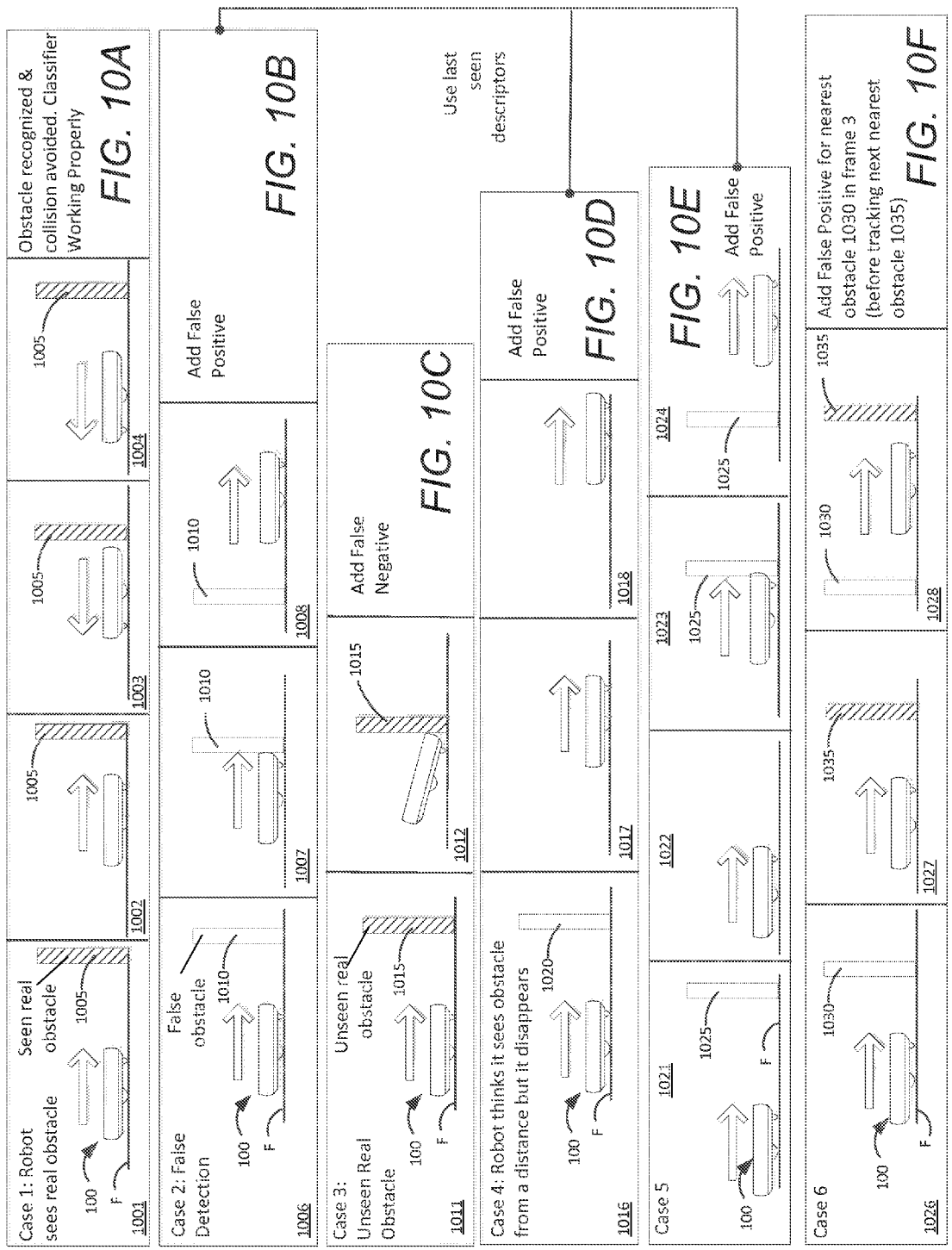

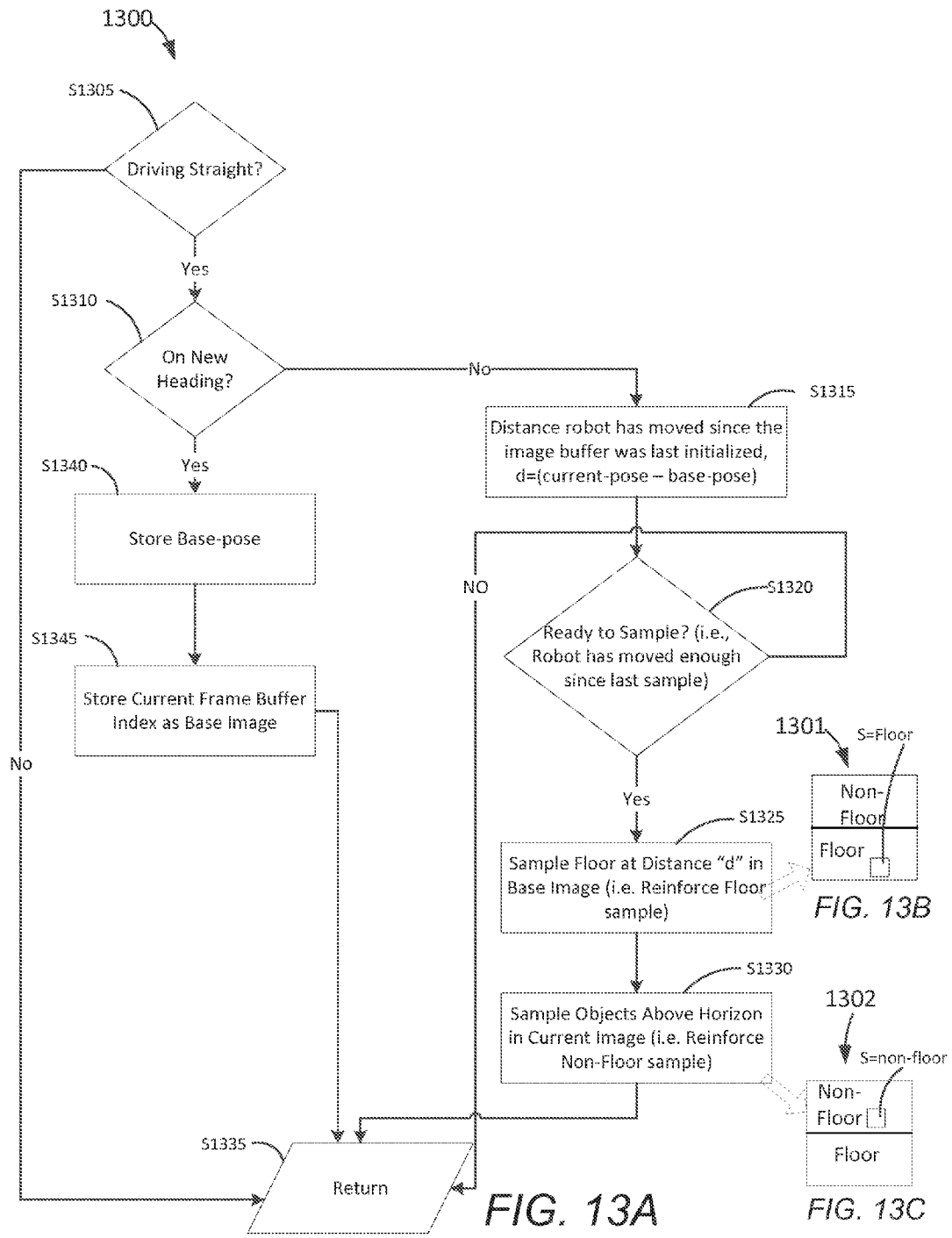

SYSTEMS AND METHODS FOR CAPTURING IMAGES AND ANNOTATING THE CAPTURED IMAGES WITH INFORMATION

CROSS-REFERENCE TO RELATED APPLICATION

The present application is a continuation application of and claims priority from U.S. patent application Ser. No. 14/572,712, filed on Dec. 16, 2014, the entire content of which is incorporated by reference herein.

TECHNICAL FIELD

Systems and methods for analyzing images using classifiers and more specifically to determining ground truths for images using mobile robots as they explore their operating environments are described herein.

BACKGROUND

Many robots are electro-mechanical machines, which are controlled by a computer. Mobile robots have the capability to move around in their environment and are not fixed to one physical location. An example of a mobile robot that is in common use today is an automated guided vehicle or automatic guided vehicle (AGV). An AGV is typically considered to be a mobile robot that follows markers or wires in the floor, or uses a vision system or lasers for navigation. Mobile robots can be found in industry, military and security environments. They also appear as consumer products, for entertainment or to perform specific tasks such as vacuum cleaning and home assistance.

Machine learning is a subfield of computer science and artificial intelligence that deals with the construction of systems that can learn or be trained from data. Machine learning can involve performing a class of processes referred to as supervised learning in which a classifier is trained using a set of ground truth training data. This ground truth training data provides example inputs and the desired outputs. In many instances, the goal of a machine learning process is to train a classifier that is able to determine a rule or set of rules that maps the inputs to the appropriate outputs. For example, in order to train a handwriting recognition classifier, the training data may include handwritten characters as inputs and the outputs would specify the actual characters that should be recognized by the classifier for the input handwritten characters. Accordingly, supervised learning processes attempt to use a function or mapping learned from a training set of inputs and outputs to generate an output for previously unseen inputs.

SUMMARY OF THE INVENTION

The present invention provides a mobile robot configured to navigate an operating environment, that includes a body containing a processor; memory containing a behavioral control application, a set of images associated with ground truth data, and a classifier; a machine vision system; a sensor system configured to generate sensor outputs providing information concerning the operating environment of the mobile robot; and a drive; where the classifier configures the processor to classify the content of images acquired by the machine vision sensor system based upon the set of images annotated with ground truth data; where the behavioral control application configures the processor to: acquire a new image using the machine vision system, where the new image contains a view of a specific region within the operating environment; actuate the drive system to enter the specific region of the operating environment; receive sensor outputs from the sensor system as the mobile robot enters the specific region of the operating environment; determine ground truth for the content of at least a portion of the new image based upon the sensor outputs and annotating the at least a portion of the new image with ground truth data; and add the at least a portion of the new image annotated with ground truth data determined by the mobile robot to the set of image portions annotated with ground truth data.

In several embodiments, the classifier may configure the processor to classify the content of images acquired by the machine vision sensor system based upon the set of images annotated with ground truth data by retraining the classifier using a training dataset comprising the set of images annotated with ground truth data and the at least a portion of the new image annotated with ground truth data.

In some embodiments, the classifier may be a Support Vector Machine. In several embodiments, the classifier may be trained using a supervised machine learning process.

In many embodiments, the classifier may configure the processor to classify the content of images acquired by the machine vision sensor system based upon the set of images annotated with ground truth data by: determining at least one nearest neighbor image in the set of images annotated with ground truth data based upon similarity to at least a portion of the new image; and classifying the content of the at least a portion of the new image based on its similarity to the at least one nearest neighbor image.

In some embodiments, the similarity of the content of the at least a portion of the new image to the content of a nearest neighbor image may be determined by: extracting features from the at least a portion of the new image; and comparing the extracted features to features extracted from the nearest neighbor image.

In several embodiments, the features may be identified using at least one of Scale-Invariant Feature Transform (SIFT) descriptors, Speeded Up Robust Features (SURF) descriptors, and Binary Robust Independent Elementary Features (BRIEF) descriptors.

In numerous embodiments, the behavioral control application further configures the processor to: generate a map of the operating environment; and associate at least a portion of the new image with a region of the map.

In certain embodiments, the behavioral control application further configures the processor to: segment the new image acquired using the machine vision sensor system into image portions; and provide at least one of the image portions to the classifier to determine the characteristics of the regions of the operating environment visible in the image portion.

In a number of embodiments, the behavioral control application configures the processor to segment the new image acquired using the machine vision sensor system into image portions by: detecting a horizon in the new image; and providing at least one portion of the new image that is located below the horizon to the classifier to determine the characteristics of the regions of the mobile robot's operating environment visible in the at least one image portion.

In several embodiments, the image portions correspond to specific distances to regions of the operating environment visible in the image portions.

In some embodiments, the memory further contains a plurality of classifiers, wherein different image portions are provided to different classifiers from the plurality of classifiers.

In some embodiments, the machine vision sensor system includes a camera that captures images of the environment that corresponds to the current driving direction of the mobile robot; and the behavioral control application configures the processor to: actuate the drive system to drive in the current driving direction of the mobile robot; annotate at least a portion of an image that corresponds to a specific region of the environment through which the mobile robot is traversing with ground truth data based upon sensor inputs received from the sensor system; and discard unannotated images when the mobile robot changes driving direction.

In some embodiments, the set of images annotated with ground truth data includes images annotated as containing views of traversable floors and images annotated as containing views of non-traversable floor.

In some embodiments, the machine vision sensor system is configured to generate a depth map for the new image; and the behavioral control application configures the processor to use the depth map to determine distances to different locations within the operating environment of the mobile robot visible within the new image.

Some embodiments of the invention provide a method of classifying the content of images acquired from within an operating environment of a mobile robot, the method includes: acquiring a new image using a machine vision sensor system of a mobile robot, where the new image contains a view of a specific region within an operating environment; classifying content of the new image based upon a set of images annotated with ground truth data using the mobile robot; actuating a drive system of the mobile robot to enter the specific region of the operating environment; receiving sensor outputs from a sensor system on the mobile robot as the mobile robot enters the specific region of the operating environment; determining ground truth data for the content of at least a portion of the new image based upon the sensor outputs using the mobile robot; annotating the at least a portion of the new image with ground truth data using the mobile robot; and adding at least a portion of the new image annotated with ground truth data to the set of image portions annotated with ground truth data using the mobile robot.

Some embodiments further include retraining the classifier using a training dataset comprising the set of images annotated with ground truth data and the new image annotated with ground truth data using a supervised machine learning system.

In some embodiments, the supervised machine learning system is implemented on the mobile robot.

In some embodiments, the supervised machine learning system is implemented on a remote server and the method further includes transmitting the at least a portion of the new image annotated with the ground truth data from the mobile robot to the remote server and receiving an updated classifier from the remote server at the mobile robot.

In some embodiments, classifying content of the new image based upon a set of images annotated with ground truth data using the mobile robot further includes: determining at least one nearest neighbor image in the set of images annotated with ground truth data based upon similarity to at least a portion of the new image; and classifying the content of the at least a portion of the new image based on its similarity to the at least one nearest neighbor image.

Some embodiments provide a method for training a classifier of a mobile robot, the method includes: obtaining a plurality of image frames along a drive direction of the mobile robot, the plurality of image frames comprising a base image frame corresponding to an initial pose of the mobile robot and subsequent image frames obtained at intervals during forward travel of the mobile robot, the mobile robot having a forward facing camera mounted thereon for obtaining the image frames, the camera having a field of view including the floor in front of the robot, and the robot having a memory device configured to store a learned data set of a plurality of descriptors determined by mobile robot events; assuming that a location is traversable floor, wherein the mobile robot is configured to detect traversable floor and non-traversable non-floor with one or more sensors mounted on the mobile robot; determining that the location is non-floor based on a robot sensor event at the location; retrieving from a frame buffer an image frame obtained immediately prior to the sensor event; generating a floor descriptor corresponding to the characteristics of the floor at the bottom of the image frame captured by the camera immediately prior to the sensor event; generating a non-floor descriptor corresponding to characteristics of the non-floor at the top of the image frame captured by the camera immediately prior to the sensor event; and storing the floor descriptor and the non-floor descriptor in the learned data set.

In some embodiments, the sensor event is detection of a collision and determining that the mobile robot has collided with the obstacle includes: receiving a bumper signal indicating a collision from a bumper sensor of the mobile robot; and verifying that the mobile robot was traveling straight prior to the collision for at least one second.

In some embodiments, the location corresponds to a patch of pixels and the one or more characteristics of the patch of pixels includes color and/or texture.

In some embodiments, texture is obtained from the detection of surface features.

In some embodiments, the learned dataset is continuously updated and the oldest descriptors are replaced by new descriptors.

In some embodiments, the learned dataset is continuously updated and descriptors having low confidence values are replaced by new descriptors having relatively higher confidence values.

In some embodiments, the descriptors are, for example, six digit numbers representing a patch of pixels of an image identified as floor or non-floor.

In some embodiments, the learned dataset is stored in memory and remains accessible by the robot between runs.

In some embodiments, the learned dataset is unpopulated at the start of each new run and the classifier trains the dataset with descriptors over the run of the mobile robot.

In certain embodiments, the learned dataset is continuously updated and the oldest descriptors are replaced by newly added descriptors.

Some embodiments of the invention provide an autonomous mobile robot including: a drive configured to maneuver the robot over a ground surface within an operating environment; a camera mounted on the robot having a field of view including the floor adjacent the mobile robot in the drive direction of the mobile robot; a frame buffer that stores image frames obtained by the camera while the mobile robot is driving; and a memory device configured to store a learned data set of a plurality of descriptors corresponding to pixel patches in image frames corresponding to portions of the operating environment and determined by mobile robot sensor events.

In some embodiments, the mobile robot further includes one or more processors executing a training process for a classifier of the learned data set, the process including: determining based on one or more sensor events that the mobile robot collided with an obstacle; retrieving a pre-collision frame from the frame buffer; identifying a lower portion of the pre-collision frame and an upper portion of the pre-collision frame; generating a first descriptor corresponding to the ground surface that the mobile robot is traveling on based on the lower portion; generate a second descriptor corresponding to at least part of the obstacle observed in the pre-collision frame based on the upper portion; and storing the first descriptor and the second descriptor in the learned data set. In some embodiments, the descriptors are, for example, six digit numbers representing a patch of pixels of an image identified as floor or non-floor.

Several embodiments of the invention provide a method for training a classifier of a mobile robot, the method including: obtaining a plurality of image frames along a drive direction of the mobile robot, the plurality of image frames comprising a base image frame corresponding to an initial pose of the mobile robot and subsequent image frames obtained at intervals during forward travel of the mobile robot, the mobile robot having a forward facing camera mounted thereon for obtaining the image frames, the camera having a field of view including the floor in front of the robot, and the robot having a memory device configured to store a learned data set of a plurality of descriptors determined by mobile robot events; assuming that a portion of the base image frame is traversable floor, wherein the mobile robot is configured to detect traversable floor and non-traversable non-floor with one or more sensors mounted on the mobile robot; determining whether the mobile robot has traversed a threshold distance in a same direction since obtaining the base image frame; identifying an upper portion and a lower portion of the base image frame; identifying a section of the lower portion of the base image frame corresponding to a current pose of the mobile robot, the section being an area of a ground surface depicted in the lower portion of the base image frame at a depth corresponding to a drive distance traversed by the mobile robot from the initial pose to the current pose; generating a floor descriptor of the section; and storing the floor descriptor in the learned data set. In some embodiments, the descriptors are, for example, six digit numbers representing a patch of pixels of an image identified as floor or non-floor.

Some embodiments further include the mobile robot not detecting a sensor event of a collision with an obstacle while traversing the threshold distance.

Several embodiments further include detecting a new heading of the mobile robot; and obtaining a plurality of image frames along the new heading of the mobile robot, the plurality of image frames comprising a new base image frame corresponding to a new initial pose of the mobile robot at the new heading.

In some embodiments, determining whether the mobile robot has traversed a threshold distance in the same direction since obtaining the base image without detecting a sensor event includes determining a distance between the initial pose of the mobile robot and a current pose of the mobile robot.

In some embodiments, the method further includes generating a non-floor descriptor corresponding to characteristics of the non-floor within the upper portion of the base image frame.

In some embodiments, the one or more characteristics of the non-floor includes at least one characteristic selected from the group consisting of: color, and texture.

In certain embodiments, identifying the upper portion and the lower portion of the base image frame includes identifying a horizon within the base image.

Some embodiments provide an autonomous mobile robot including: a drive configured to maneuver to mobile robot over a ground surface within an operating environment; a camera mounted on the mobile robot having a field of view including the floor adjacent the mobile robot in the drive direction of the mobile robot; a frame buffer that stores image frames obtained by the camera while the mobile robot is driving; and a memory device configured to store a learned data set of a plurality of descriptors corresponding to pixel patches in image frames corresponding to portions of the operating environment and determined by mobile robot sensor events; one or more processors executing a training process for a classifier of the learned data set, the process including: assuming that a portion of the base image frame is traversable floor, wherein the mobile robot is configured to detect traversable floor and non-traversable non-floor with one or more sensors mounted on the mobile robot; determining whether the mobile robot has traversed a threshold distance in a same direction since obtaining the base image frame; identifying an upper portion and a lower portion of the base image frame; identifying a section of the lower portion of the base image frame corresponding to a current pose of the mobile robot, the section being an area of a ground surface depicted in the lower portion of the base image frame at a depth corresponding to a drive distance traversed by the mobile robot from the initial pose to the current pose; generating a floor descriptor of the section; and storing the floor descriptor in the learned data set. In some embodiments, the descriptors are, for example, six digit numbers representing a patch of pixels of an image identified as floor or non-floor.

In some embodiments, the descriptor for the patch of pixels includes at least one characteristic including color or texture.

In some embodiments, the process further includes not detecting a sensor event of a collision with an obstacle while traversing the threshold distance.

In several embodiments, the process further includes: detecting a new heading of the mobile robot; and obtaining a plurality of image frames along the new heading of the mobile robot, the plurality of image frames comprising a new base image frame corresponding to a new initial pose of the mobile robot at the new heading.

In certain embodiments, determining whether the mobile robot has traversed a threshold distance in the same direction since obtaining the base image without detecting a sensor event includes determining a distance between the initial pose of the mobile robot and a current pose of the mobile robot.

In numerous embodiments, the process further includes generating a non-floor descriptor corresponding to characteristics of the non-floor within the upper portion of the base image frame. In some embodiments, the non-floor descriptor is, for example, six digit number representing a patch of pixels of an image identified non-floor.

In some embodiments, identifying the upper portion and the lower portion of the base image frame includes identifying a horizon within the base image.

Some embodiments of the invention provide a method for training a classifier of a mobile robot, the method including: obtaining a plurality of image frames along a drive direction of the mobile robot, the plurality of image frames comprising a base image frame corresponding to an initial pose of the mobile robot and subsequent image frames obtained at intervals during forward travel of the mobile robot, the mobile robot having a forward facing camera mounted thereon for obtaining the image frames, the camera having a field of view including the floor in front of the robot, and the robot having a memory device configured to store a learned data set of a plurality of descriptors determined by mobile robot events; tracking a location as non-traversable non-floor based on the plurality of descriptors, wherein the mobile robot is configured to detect traversable floor and non-traversable non-floor with one or more sensors mounted on the mobile robot; determining that the location is traversable floor after traveling a distance to the location and not detecting a robot sensor event at the location; generating a floor descriptor corresponding to the characteristics of the floor at the location within the image frame captured by the camera; and updating the floor descriptors in the learned data set. In some embodiments, the descriptors are, for example, six digit numbers representing a patch of pixels at a location of an image identified as floor or non-floor.

In some embodiments, the distance traveled is based on an expected change in a wheel encoder.

In some embodiments the method further includes detecting a heading change and resetting a tracking of the location to a new location that corresponds to non-traversable non-floor.

In several embodiments, the location corresponds to a patch of pixels and the one or more characteristics of the patch of pixels includes at least one characteristic selected from the group consisting of: color; and texture.

In certain embodiments, not detecting the sensor event includes determining that the mobile robot has not collided with an obstacle.

Some embodiments of the invention provide an autonomous mobile robot including: a drive configured to maneuver to mobile robot over a ground surface within an operating environment; a camera mounted on the mobile robot having a field of view including the floor adjacent the mobile robot in the drive direction of the mobile robot; a frame buffer that stores image frames obtained by the camera while the mobile robot is driving; and a memory device configured to store a learned data set of a plurality of descriptors corresponding to pixel patches in image frames corresponding to portions of the operating environment and determined by mobile robot sensor events; one or more processors executing a training process for a classifier of the learned data set, the process including: tracking a location as non-traversable non-floor based on the plurality of descriptors, wherein the mobile robot is configured to detect traversable floor and non-traversable non-floor with one or more sensors mounted on the mobile robot; determining that the location is traversable floor after traveling a distance to the location and not detecting a robot sensor event at the location; generating a floor descriptor corresponding to the characteristics of the floor at the location within the image frame captured by the camera; and updating the floor descriptors in the learned data set. In some embodiments, the descriptors are, for example, six digit numbers representing a patch of pixels identified as floor or non-floor at the location in the image frame.

In some embodiments, the distance traveled is based on an expected change in a wheel encoder.

In some embodiments, the process further includes detecting a heading change and resetting a tracking of the location to a new location that corresponds to non-traversable non-floor.

In some embodiments, the location corresponds to a patch of pixels and the one or more characteristics of the patch of pixels include at least one characteristic selected from the group consisting of: color; and texture.

In several embodiments, not detecting the sensor event includes determining that the mobile robot has not collided with an obstacle.

Some embodiments of the invention provide a method for training a classifier of a mobile robot, the method including: obtaining a plurality of image frames along a drive direction of the mobile robot, the plurality of image frames comprising a base image frame corresponding to an initial pose of the mobile robot and subsequent image frames obtained at intervals during forward travel of the mobile robot, the mobile robot having a forward facing camera mounted thereon for obtaining the image frames, the camera having a field of view including the floor in front of the robot, and the robot having a memory device configured to store a learned data set of a plurality of descriptors determined by mobile robot events; detecting a plurality of obstacles located at a plurality of distances from the mobile robot; tracking a first obstacle that is closest to the mobile robot and buffering descriptors of the first obstacle in the learned data set; traveling a threshold distance and detecting a second obstacle that is closer to the mobile robot than the first obstacle; resetting the mobile robot to not track the first obstacle; and tracking the second obstacle and buffering descriptors of the second obstacle in the learned data set. In some embodiments, the descriptors are, for example, six digit numbers representing a patch of pixels identified as floor or non-floor at a location in an image frame.

In some embodiments, an obstacle corresponds to a patch of pixels and the one or more characteristics of the patch of pixels at least one characteristic selected from the group consisting of: color; and texture.

In some embodiments, tracking an obstacle includes tracking a movement of a patch of pixels through a plurality of image frames based on movement of the mobile robot.

In certain embodiments, the method further includes traveling the threshold distance prior to capturing a new image.

In several embodiments, the method further includes buffering descriptors of the closest obstacle and updating the learned dataset with the descriptors.

Some embodiments of the invention provide an autonomous mobile robot including: a drive configured to maneuver to mobile robot over a ground surface within an operating environment; a camera mounted on the mobile robot having a field of view including the floor adjacent the mobile robot in the drive direction of the mobile robot; a frame buffer that stores image frames obtained by the camera while the mobile robot is driving; and a memory device configured to store a learned data set of a plurality of descriptors corresponding to pixel patches in image frames corresponding to portions of the operating environment and determined by mobile robot sensor events; one or more processors executing a training process for a classifier of the learned data set, the process including: detecting a plurality of obstacles located at a plurality of distances from the mobile robot; tracking a first obstacle that is closest to the mobile robot and buffering descriptors of the first obstacle in the learned data set; traveling a threshold distance and detecting a second obstacle that is closer to the mobile robot than the first obstacle; resetting the mobile robot to not track the first obstacle; and tracking the second obstacle and buffering descriptors of the second obstacle in the learned data set. In some embodiments, the descriptors are, for example, six digit numbers representing a patch of pixels identified as floor or non-floor in an image frame.

In some embodiments, an obstacle corresponds to a patch of pixels and the one or more characteristics of the patch of pixels includes at least one characteristic selected from the group consisting of: color; and texture.

In certain embodiments, tracking an obstacle includes tracking a movement of a patch of pixels through a plurality of image frames based on movement of the mobile robot.

In some embodiments, the process further includes traveling a threshold distance prior to capturing a new image.

In several embodiments, the process further includes buffering descriptors of the closest obstacle and updating the learned dataset with the descriptors.

BRIEF DESCRIPTION OF THE DRAWINGS

FIG. 10A illustrates an example of training a classifier for distinguishing traversable floor and non-traversable floor.

FIG. 10B illustrates an example of training a classifier for distinguishing traversable floor and non-traversable floor.

FIG. 10C illustrates an example of training a classifier for distinguishing traversable floor and non-traversable floor.

FIG. 10D illustrates an example of training a classifier for distinguishing traversable floor and non-traversable floor.

FIG. 10E illustrates an example of training a classifier for distinguishing traversable floor and non-traversable floor.

FIG. 10F illustrates an example of training a classifier for distinguishing traversable floor and non-traversable floor.

FIG. 13A is a flow chart illustrating a process for a true negative training algorithm.

FIG. 13B is a schematic illustrating sampling a floor sample from a base image to reinforce the trained classifier dataset for a traversable floor sample.

FIG. 13C is a schematic illustrating sampling a non-floor sample from a current image frame to reinforce the trained classifier dataset for a non-floor sample.

DETAILED DESCRIPTION

Figure 1:
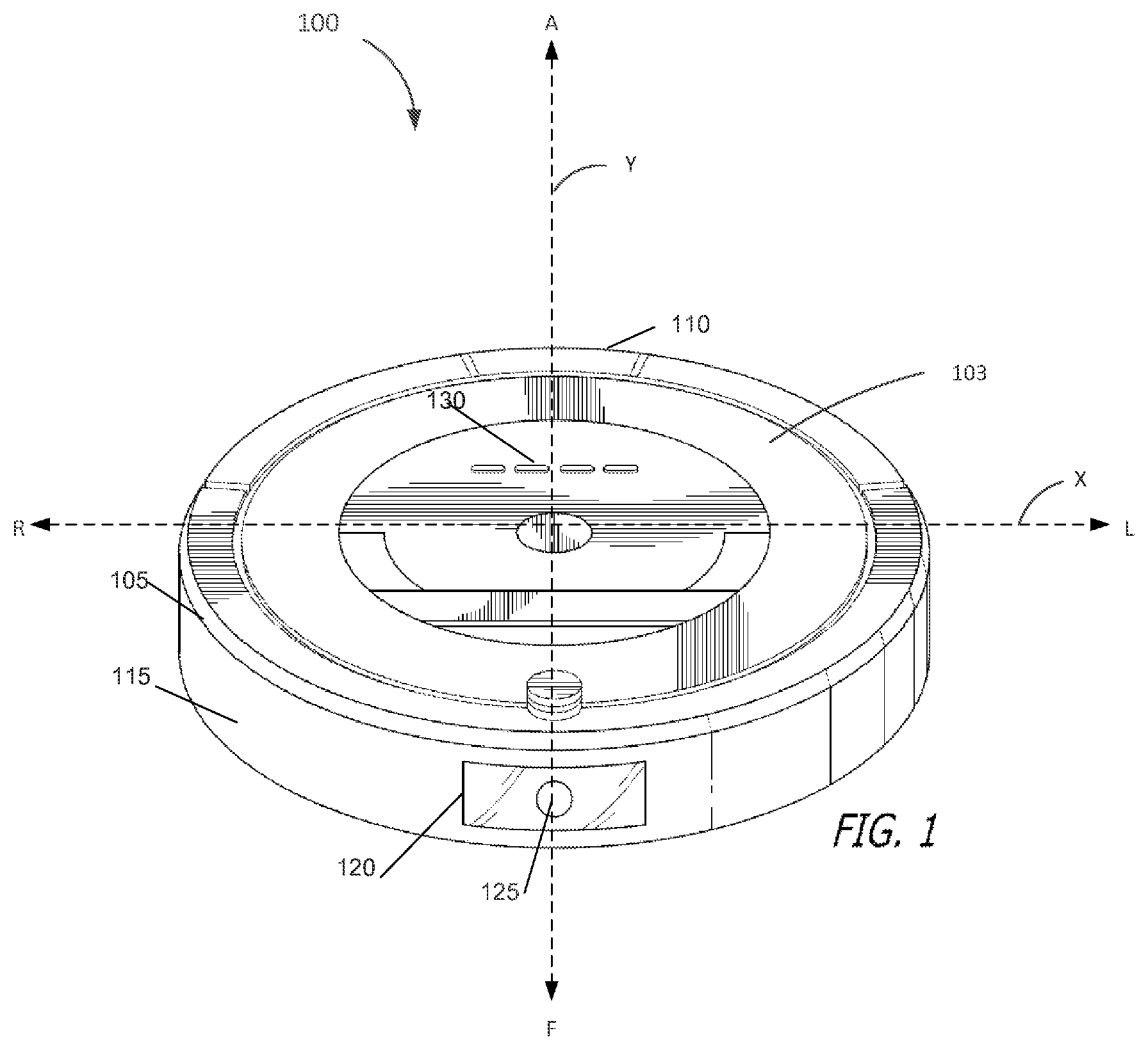
FIG. 1 is a front perspective view of a mobile robot incorporating a machine vision sensor system.

Some mobile robots may implement machine vision to assist in the navigation of the mobile robot 100. These mobile robots may include classifiers which analyze the field of view of the robot and predict whether the mobile robot is likely to encounter an obstacle in an upcoming segment of its path or whether the mobile robot is likely able to travel the upcoming segment without encountering an obstacle. The techniques disclosed herein are directed to training the classifier. In particular, trainers are disclosed for training the classifier when the classifier incorrectly predicts a positive event, incorrectly predicts a negative event, and correctly predicts a negative event.

Turning now to the drawings, systems and methods for capturing images and annotating the captured images with ground truth information as mobile robots explore their operating environments are illustrated. In some examples described herein, mobile robots use classifiers to determine information from images of the mobile robot's operating environment. In some embodiments, the classifiers are generated using a supervised machine learning technique in which the classifier is repeatedly retrained using images and ground truths obtained by the mobile robot 100 while exploring its operating environment. In a number of embodiments, the classifier uses annotated example or template images in the classification process and the mobile robot 100 gathers additional annotated examples by capturing images and determining ground truths for the captured images. It is believed to be advantageous to update sets of images and ground truths used by the mobile robot to determine the characteristics of the environment surrounding the mobile robot, including the presence of obstacles, because the sets of images with ground truths will be updated with information that is specific to the particular environment in which the mobile robot will navigate. In particular, updated images may be obtained and used to train the classifier that reflect the characteristics of the environment surrounding the mobile robot, thus optimizing the classifier for the particular environment. As can readily be appreciated, a classifier trained using examples specific to a particular operating environment is being trained to identify the specific obstacles that exist within that operating environment as opposed to being trained to identify obstacles that may or may not resemble the actual obstacles within the mobile robot's environment.

As a mobile robot 100 moves through an environment, its behavior should ideally be responsive to the changing characteristics of the environment. Many mobile robots determine their behavior based upon information gathered using sensors. In a number of embodiments, mobile robots include one or more machine vision sensor systems that can be used to obtain images of the mobile robot's operating environment. The machine vision sensor systems can include one or more cameras that obtain images and/or sequences of frames of video. In many embodiments, the machine vision sensor system is capable of generating a depth map for the particular scene being captured. The depth map may be used to determine distances to various locations and/or objects visible within the captured image. In some embodiments, the cameras are arranged in a multi-view stereo camera configuration that captures images of the scene from different viewpoints, from which disparity can be utilized to derive distance information. Other embodiments may generate distance information using any of a variety of sensors appropriate to the requirements of a specific application such as, but not limited to, time of flight cameras, structured light cameras, and/or LIDAR systems.

As noted above, mobile robots can use classifiers to understand the content of images captured by a machine vision sensor system. A classifier can be an algorithm implemented to identify observations as falling into one category or another, such as robot camera observations of pixels associated with traversable floor and non-traversable floor categories. Many classifiers accomplish the identification using a training set of known data associated with previously categorized observations. Alternatively, the classifier can utilize a set of rules that map inputs, such as sets of pixels to outputs such as traversable floor and non-traversable floor, where the rules are determined using machine learning techniques based upon a training set of known data associated with previously categorized observations. Classifier outputs can be utilized to determine appropriate behavior such as (but not limited to) changing direction to avoid an obstacle. For example, information generated by classifiers can specify portions of a captured image that contain traversable floor and/or portions of the captured image that contain obstacles and/or non-traversable floor. The classifier outputs can also indicate the distance to a feature within a captured image.

A mobile robot 100 can include numerous other sensors in addition to the sensor(s) contained within a machine vision sensor system. Such additional sensors can include (but are not limited to) collision sensors, bumper sensors, stall sensors, infrared proximity sensors, and/or sonar sensors. Each type of sensor can provide information regarding the mobile robot's surrounding environment. For example, a bumper sensor 115 may provide information regarding the presence of an obstacle contacting an edge of the mobile robot 100 while a sonar sensor may provide information regarding the presence of a proximate obstacle. In many embodiments, mobile robots continuously obtain images as they navigate within an environment and generate ground truth information using other sensors. For example, if a mobile robot 100 bumper sensor 115 triggers upon collision with an obstacle positioned at a location visible in a previously captured image, the mobile robot 100 may add the image and/or a particular portion of the image to a non-floor dataset. Likewise, if the robot detects or is able to verify the existence of traversable floor for other portions of the image, the robot may add the image and/or portion(s) of the image to a traversable floor dataset. By continuously updating annotated datasets generated based on the actual environment in which the robot is navigating, a machine learning algorithm can use the annotated datasets to increase the accuracy with which the mobile robot 100 understands its surrounding environment. In this context, an annotated dataset is a set of data used by the classifier or used in the training of the classifier that is annotated with ground truth. There are a variety of ways in which data can be annotated including (but not limited to) associating specific fields of metadata describing a piece of data in the dataset with the described piece of data within a database. Similarly, the additional annotated images can improve the performance accuracy and reliability of a classifier that utilizes the annotated datasets in a classification process. As can readily be appreciated, training classifiers and/or performing classification using images specific to the environment in which a mobile robot 100 is operating is likely to significantly improve the performance of the classifiers within that environment.

In several embodiments, mobile robots 100 are provisioned with an initial annotated dataset for use in the subsequent retraining of classifiers and/or performing classification. The initial dataset likely contains images that are not specific to the operating environment of the mobile robot 100, and the initial dataset is supplemented with images captured from within the operating environment of the mobile robot 100 as it explores. In other embodiments, mobile robots 100 are deployed to a particular environment and initially do not utilize classifiers to understand the content of images captured by the machine vision sensor system of the robot. Instead, the mobile robots 100 collect annotated data by exploring their operating environments and use the annotated data to build classifiers that enable the mobile robots 100 to interpret subsequently captured images and/or perform classification. In this way, annotated datasets can be continuously updated as the robot navigates within the environment.

In several embodiments, a mobile robot 100 may be programmed to support a behavior in which the mobile robot 100 seeks out ground truth information concerning the content of images captured by a machine vision sensor system. In this way, the mobile robot 100 can annotate images captured by the machine vision sensor system and add the annotated images to annotated data sets for use in the (re)training of one or more classifiers and/or performing classification depending upon the characteristics of the one or more classifiers. In many embodiments, a behavior involving seeking out ground truth information is driven by the reliability of the information generated by the one or more classifiers utilized by the mobile robot 100. A classifier utilized by a mobile robot 100 can generate one or more confidence metrics with respect to the classification of image content. The confidence metric(s) generated by a classifier can be utilized by the mobile robot 100 to determine whether to seek ground truth information concerning the content of an image provided as an input to the classifier.

Various location and mapping techniques can be used by the mobile robot 100. In a number of embodiments, the mobile robot 100 constructs a map of the environment using visual simultaneous location and mapping (V-SLAM). V-SLAM may be used to generate one or more maps of the environment and images or portions of images captured by the robot can be associated with different regions within the map(s). In many embodiments, the pose of a mobile robot 100 can be used to relate images and/or portions of images with regions in a map. The mobile robot 100 can then track its location and establish ground truth information with respect to captured images and/or image portions corresponding to views of specific map locations. In addition, a mobile robot 100 can utilize the map(s) to identify different views of the same region for which a classifier produces conflicting results and can establish ground truth for the region for use in retraining the classifier(s).

Although much of the discussion that follows describes the classification of traversable and non-traversable floor, the techniques disclosed herein can be utilized by mobile robot 100s to train classifiers capable of detecting and/or recognizing any of a variety of different features observable in images captured by a machine vision sensor system based upon ground truth independently established by the mobile robot 100 using additional sensors. Accordingly, systems and methods for capturing images and annotating the captured images with ground truth information as mobile robots 100 explore their operating environments in accordance with embodiments of the invention are discussed further below.

Mobile Robots that Collect Ground Truths and Annotate Images

Figure 2:
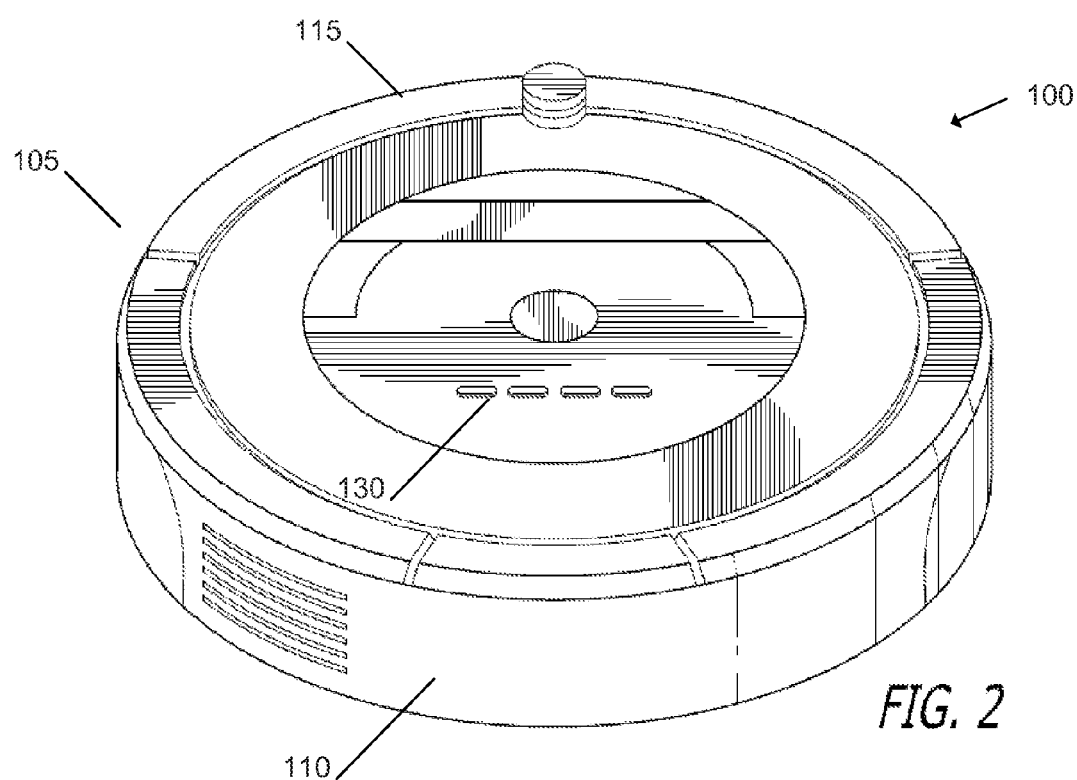
FIG. 2 is a rear perspective view of a mobile robot incorporating a machine vision sensor system.

Mobile robots described herein incorporate machine vision sensor systems to obtain image data and additional sensors that receive inputs that can be used to derive ground truths concerning the content of images captured by the machine vision sensor system. The ground truths can then be utilized by the mobile robots 100 to train classifiers using training data specific to the operating environment of the robot. In many embodiments, the annotated images can be utilized in the performance of the classification process itself. An exemplary mobile robot 100 that utilizes a machine vision sensor system and additional sensors to collect ground truth data as the mobile robot 100 explores its environment is illustrated in FIGS. 1-2. In particular, FIG. 1 illustrates a front view of the mobile robot 100 while FIG. 2 illustrates a back view.

In the embodiment illustrated in FIG. 1, the mobile robot 100 includes a rounded body 103 supported by a drive system (located beneath the body 103 and thus not visible in this illustration) that can maneuver the robot across a floor surface. In several embodiments, the mobile robot 100 is configured to actuate its drive system based on a drive command. In some embodiments, the drive command may have x, y, and θ components and the command may be issued by a controller. The mobile robot 100 body 103 has a forward portion 105 corresponding to the front half of the rounded shaped body 103, and a rearward portion 110 corresponding the back half of the rounded shaped body 103. In the illustrated embodiment, the drive system includes right and left driven wheel modules that may provide odometry to the controller. In the illustrated embodiment, the wheel modules are substantially opposed along a transverse axis X defined by the body 103 and include respective drive motors driving respective wheels. The drive motors may releasably connect to the body 103 (e.g., via fasteners or tool-less connections) with the drive motors optionally positioned substantially over the respective wheels. The wheel modules can be releasably attached to the chassis and forced into engagement with the cleaning surface by springs. The mobile robot 100 may include a caster wheel (not illustrated) disposed to support a forward portion of the mobile robot body. body 103. The mobile robot body 103 supports a power source (e.g., a battery) for powering any electrical components of the mobile robot 100. Although specific drive mechanisms are described above with reference to FIG. 1, any of a variety of drive mechanisms appropriate to the requirements of specific mobile robot 100 applications can be utilized in accordance with embodiments of the invention.

Referring again to FIG. 1, the mobile robot 100 can move across the cleaning surface through various combinations of movements relative to three mutually perpendicular axes defined by the body 103: a transverse axis X, a fore-aft axis Y, and a central vertical axis Z (not shown). A forward drive direction along the fore-aft axis Y is designated F (sometimes referred to hereinafter as "forward"), and an aft drive direction along the fore-aft axis Y is designated A (sometimes referred to hereinafter as "rearward"). The transverse axis X extends between a right side R and a left side L of the robot substantially along an axis defined by center points of the wheel modules.

In many embodiments, a forward portion 105 of the body 103 carries a bumper 115, which can be utilized to detect (e.g., via one or more electromechanical sensors) events including (but not limited to) collision with obstacles in a drive path of the mobile robot 100. Depending upon the behavioral programming of the mobile robot 100, it may respond to events (e.g., obstacles, walls) detected by the bumper 115 by controlling the wheel modules to maneuver the robot in response to the event (e.g., away from an obstacle). The bumper 115 may also include a machine vision sensor system 120 that includes one or more cameras 125 (e.g., standard cameras, volumetric point cloud imaging cameras, three-dimensional (3D) imaging cameras, cameras with depth map sensors, visible light cameras and/or infrared cameras) that capture images of the surrounding environment. In some embodiments, the machine vision sensor system 120 captures images of the environment that corresponds to the current driving direction of the mobile robot 100 and if the mobile robot 100 maintains its driving direction, the mobile robot 100 may traverse regions of the environment that are depicted within the captured image.

The images captured by the machine vision sensor system 120 are analyzed by one or more classifiers and the outputs of the classifiers are used to make intelligent decisions about actions to take based on the operating environment. The captured images may also be used to generate additional annotated image data for retraining the one or more classifiers and/or performing classification. While the camera 125 of the machine vision sensor system 120 is described herein as being arranged on the front bumper 115, the camera 125 can additionally or alternatively be arranged at any of various different positions on the mobile robot 100, including on the top, bottom, or at different locations along the sides of the mobile robot 100.

In addition to the machine vision sensor system 120, a mobile robot 100 may include different types of sensor systems in order to achieve reliable and robust autonomous movement. The additional sensor systems may be used in conjunction with one another to create a perception of the environment sufficient to allow the mobile robot 100 to make intelligent decisions about actions to take in that environment. The various sensor systems may include one or more types of sensors supported by the robot body 103 including, but not limited to, obstacle detection obstacle avoidance (ODOA) sensors, communication sensors, navigation sensors, range finding sensors, proximity sensors, contact sensors, sonar, radar, LIDAR (Light Detection And Ranging, which can entail optical remote sensing that measures properties of scattered light to find range and/or other information of a distant target), and/or LADAR (Laser Detection and Ranging). In some implementations, the sensor system includes ranging sonar sensors, proximity cliff detectors, contact sensors, a laser scanner, and/or an imaging sonar.

There are several challenges involved in placing sensors on a robotics platform. First, the sensors are typically placed such that they have maximum coverage of areas of interest around the mobile robot 100. Second, the sensors are typically placed in such a way that the robot itself causes an absolute minimum of occlusion to the sensors; in essence, the sensors should not be placed such that they are blinded by the robot itself and prevented from functioning. Third, the placement and mounting of the sensors should not be intrusive to the rest of the industrial design of the platform. In terms of aesthetics, it can be assumed that a robot with sensors mounted inconspicuously is more attractive than otherwise, therefore in this robot 100, the sensors are placed inconspicuously under the decorative cover plate on the top surface of the robot 100 or behind the bumper 115. In terms of utility, sensors are mounted in a manner so as not to interfere with normal robot operation (e.g., snagging on obstacles).

FIG. 2 illustrates a perspective rear view of the same mobile robot 100 illustrated in FIG. 1. As illustrated, a user interface 130 is disposed on a top portion of the body 103 and can be used to receive one or more user commands and/or display a status of the mobile robot 100. The user interface 130 is in communication with the robot controller carried by the robot such that one or more commands received by the user interface can initiate execution of a cleaning routine by the robot.

Although various mobile robot 100 architectures that utilize machine vision sensor systems and additional sensors to collect ground truth data are described above with reference to FIG. 1 and FIG. 2, any of a variety of mobile robots 100 can be constructed that utilize machine vision sensor systems and additional sensors to collect ground truth data in configurations appropriate to the requirements of specific applications in accordance with embodiments of the invention.

Use of Classifiers in Determining Mobile Robot Behavior

The behavior of a mobile robot 100 is typically selected from a number of behaviors based upon the characteristics of the surrounding operating environment and/or the state of the mobile robot 100. In many embodiments, characteristics of the environment may be ascertained from images captured by a machine vision sensor system. Captured images can be analyzed using one or more classifiers that can be used to identify features of the images such as (but not limited to) the locations of floors and/or obstacles. In many embodiments, classifiers are trained using supervised machine learning techniques utilizing training data collected from the operating environment of the mobile robot 100. In several embodiments, the classifiers utilize annotated images and/or features of annotated images during the classification process.

Figure 3:
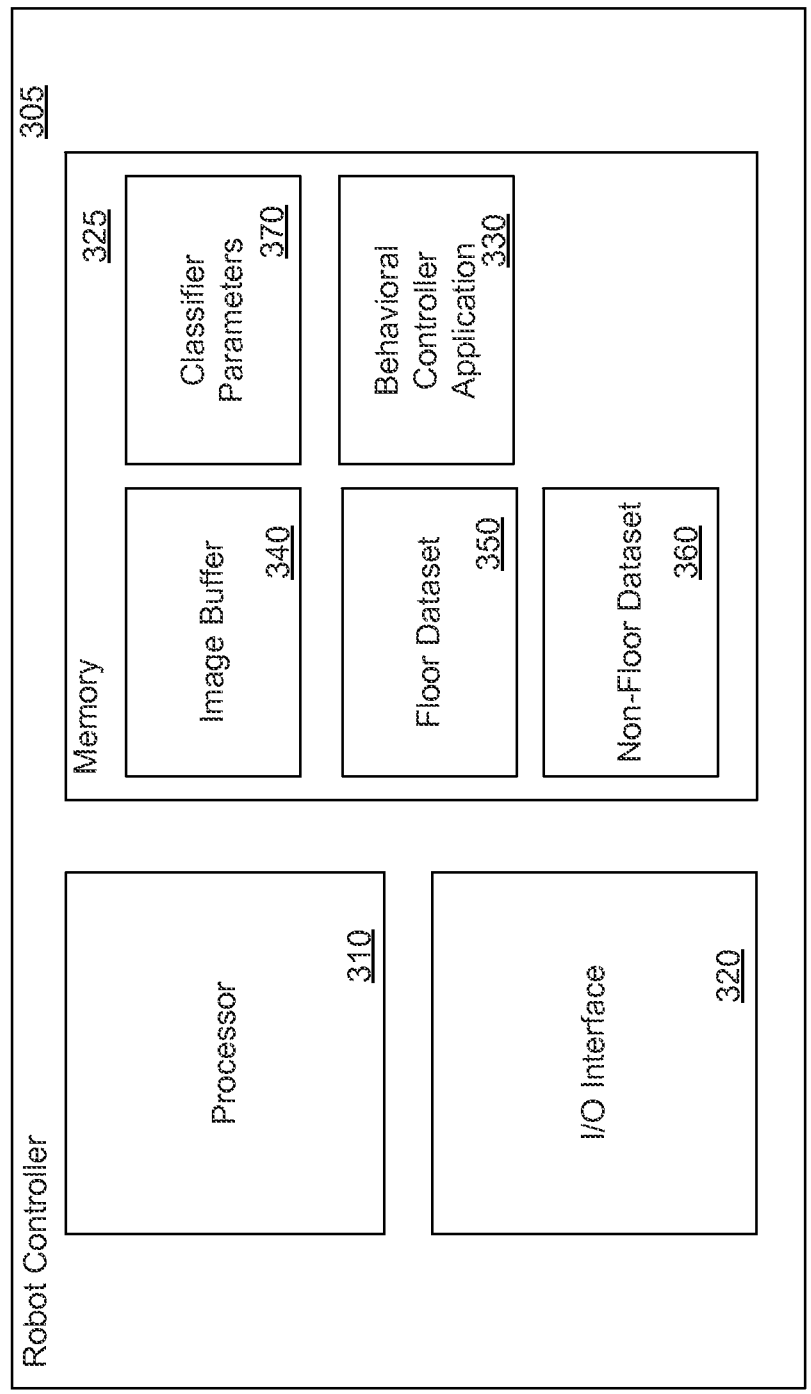
FIG. 3 conceptually illustrates a robot controller.

A mobile robot 100 controller that can be used to acquire images using a machine vision sensor system and train one or more classifiers in accordance with an embodiment of the invention is illustrated in FIG. 3. The robot controller 305 includes a processor 310 in communication with a memory 325 and an input/output interface 320. The processor can be a single microprocessor, multiple microprocessors, a many-core processor, a microcontroller, and/or any other general purpose computing system that can be configured by software and/or firmware. The memory 325 contains a behavior control application 330. The behavioral control application 330 controls the actuation of different behaviors of the mobile robot 100 based on the surrounding environment and the state of the mobile robot 100.

In the illustrated embodiment, the memory 325 also includes an image buffer 340 that stores images captured by the machine vision sensor system of the mobile robot 100. In some implementations, the image buffer 340 is a circular buffer of fixed size that operates in a first in first out (FIFO) manner. In this way, when a new image is added to the image buffer 340, the oldest image is purged from the image buffer. In other embodiments, any of a variety of techniques for temporarily storing accumulated images captured by the machine vision sensor system of a mobile robot 100 can be utilized in accordance with embodiments of the invention. In many implementations, there may be metadata associated with the images in the image buffer 340. Examples of metadata that may be associated with an image include, but are not limited to, the pose of the mobile robot 100 when the image was captured, a depth map associated with the image, and/or a time that the image was captured.

In the illustrated embodiment, the floor dataset 350 includes portions of images, a patch of pixels for example represented in an image by a patch of color or texture, that have been annotated as corresponding to floors and the non-floor dataset 360 includes portions of images that have been annotated as corresponding to non-floor. The non-floor dataset 360 may include patches of pixels determined to be non-traversable floor, such as a spot on a floor occupied by an obstacle. As can readily be appreciated, any of a variety of annotated datasets can be maintained on a mobile robot 100 as appropriate to the requirements of specific applications in accordance with embodiments of the invention. In some embodiments, the training datasets 350 and 360 may be seeded with portions of images that are not specific to the environment in which the mobile robot 100 is operating. As described below under the section "Training a Classifier Using Training Data Generated by a Mobile Robot," in several embodiments, training datasets may be continuously updated with new annotated data that is generated as the robot 100 navigates within its operating environment. In other embodiments, the datasets are entirely generated from images captured by the mobile robot 100 as it navigates an operating environment.

As noted above, the annotated datasets can be utilized to train classifiers using machine learning processes. In several embodiments, the classifiers are support vector machines. In other embodiments, any of a variety of supervised machine learning techniques can be utilized to construct a classifier capable of detecting and/or recognizing the presence and/or absence of specific characteristics within images. While much of the discussion that follows assumes that a supervised machine learning process is utilized in the generation of a classifier, in a number of embodiments simple classifiers are constructed using annotated images as templates and feature matching can be performed between the templates and newly acquired images to determine the characteristics of the newly acquired images based upon template similarity. In certain embodiments, features are extracted from a newly acquired image and the features are compared to features of a set of annotated template images using a nearest-neighbor classifier. The closest image can be identified in one or more annotated datasets (note the datasets are used here for classification and not training) and a comparison performed between the features of the newly acquired image and the closest template image. Any of a variety of features can be utilized in performing the comparison including (but not limited to) 2D features, 3D features, features identified using Scale-invariant Feature Transform (SIFT) descriptors, features identified using a Speeded Up Robust Features (SURF) descriptors, and/or features identified using a Binary Robust Independent Elementary Features (BRIEF) descriptors. A positive classification with respect to the annotated characteristics of the template image can be determined based upon the similarity of the features of the newly acquired image and the features of the closest template image exceeding a predetermined threshold. In view of the ability of mobile robots 100 in accordance with embodiments of the invention to utilize classifiers including (but not limited to) support vector machines, and nearest-neighbor classifiers, it should be appreciated that any classification approach can be utilized in which the classifier utilizes images acquired from within the operating environment for which ground truth is determined by the mobile robot 100 for training and/or classification in accordance with embodiments of the invention. The resulting classifier(s) can be described using classifier parameters 370 that specify the manner in which the classifier(s) analyze captured images.

In some embodiments, as images are analyzed using classifiers configured using the classifier parameters 370, the behavioral control application 330 determines how the mobile robot 100 should behave based on the understanding of the environment surrounding the mobile robot 100. The behavioral control application 330 may select from a number of different behaviors based on the particular characteristics of the environment and/or the state of the robot. The behaviors may include, but are not limited to, a wall following behavior, an obstacle avoidance behavior, an escape behavior, and/or a ground truth acquisition behavior among many other primitive behaviors that may be actuated by the robot.

In several embodiments, the input/output interface provides devices such as (but not limited to) sensors with the ability to communicate with the processor and/or memory. In other embodiments, the input/output interface provides the mobile robot 100 with the ability to communicate with remote computing devices via a wired and/or wireless data connection. Although various robot controller architectures are illustrated in FIG. 3, any of a variety of architectures including architectures where the robot behavioral controller application is located on disk or some other form of storage and is loaded into memory at runtime and/or where the robot behavioral controller application is implemented using a variety of software, hardware, and/or firmware can be utilized in the implementation of a robot controller in accordance with embodiments of the invention. The conceptual operation of mobile robots 100 configured by robot controllers in accordance with various embodiments of the invention is discussed further below.

Mobile Robot Behavioral Control Systems

Mobile robots in accordance with a number of embodiments of the invention may include behavioral control applications used to determine the mobile robot's 100 behavior based upon the surrounding environment and/or the state of the mobile robot 100. In many embodiments, the mobile robot 100 can include one or more behaviors that are activated by specific sensor inputs and an arbitrator determines which behaviors should be activated. In many embodiments, sensor inputs can include images of the environment surrounding the mobile robot 100 and behaviors can be activated in response to characteristics of the environment ascertained from one or more captured images.

Figure 4:
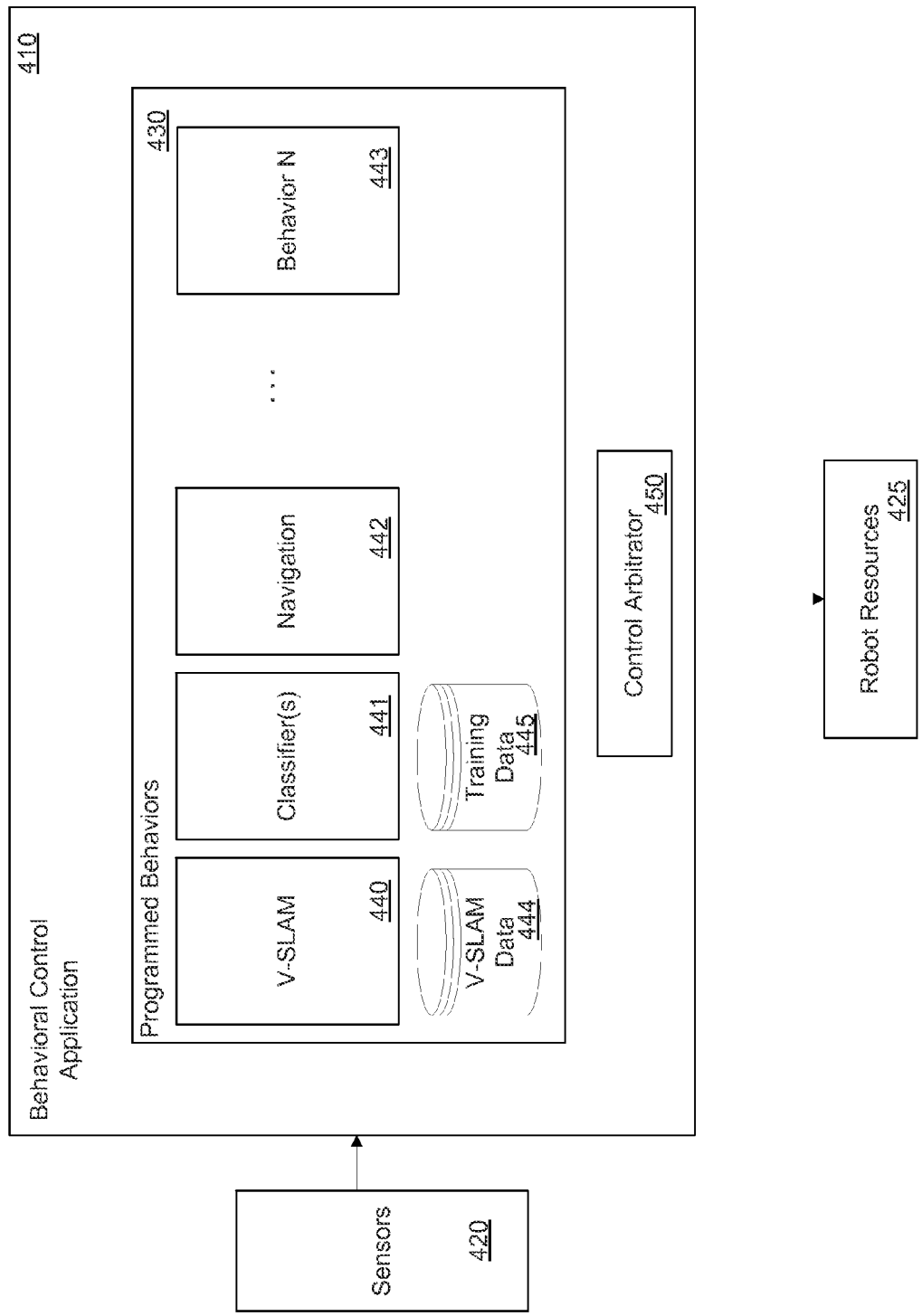
FIG. 4 conceptually illustrates the execution of a behavioral control application by a robot controller.

Mobile robot behavioral control applications configured to enable navigation within an environment based upon information including (but not limited to) classifier outputs in accordance with many embodiments of the invention are conceptually illustrated in FIG. 4. The mobile robot 100 behavioral control application 410 can receive information regarding its surrounding environment from one or more sensors 420 (e.g., machine vision sensor system, bump, proximity, wall, stasis, and/or cliff sensors) carried by the mobile robot 100. The mobile robot 100 behavioral control application 410 can control the utilization of robot resources 425 (e.g., the wheels modules) in response to information received from the sensors 460, causing the mobile robot 100 to actuate behaviors, which may be based on the surrounding environment. For example, when a mobile robot 100 is used to clean an environment, the mobile robot 100 behavioral control application 410 may receive images from a machine vision sensor system and direct the mobile robot 100 to navigate through the environment while avoiding obstacles and clutter being detected within the images. The mobile robot 100 behavioral control application 410 can be implemented using one or more processors in communication with memory containing non-transitory machine readable instructions that configure the processor(s) to implement a programmed behaviors system 430 and a control arbitrator 450.

The programmed behaviors 430 may include various modules that may be used to actuate different behaviors of the mobile robot 100. In particular, the programmed behaviors 430 may include a V-SLAM module 440 and corresponding V-SLAM database 444, one or more classifiers 441 and a corresponding training database 445 used to train the classifiers 441, a navigation module 442, and a number of additional behavior modules 443.

In the illustrated embodiment, the V-SLAM module 440 manages the mapping of the environment in which the mobile robot 100 operates and the localization of the mobile robot 100 with respect to the mapping. The V-SLAM module 440 can store data regarding the mapping of the environment in the V-SLAM database 444. The data may include a map of the environment and characteristics of different regions of the map including, for example, regions that contain obstacles, other regions that contain traversable floor, regions that have been traversed, regions that have not yet been traversed, regions with respect to which a ground truth has been established, the date and time of the information describing a specific region, and/or additional information that may be appropriate to the requirements of a specific application. In many instances, the VSLAM database also includes information regarding the boundaries of the environment, including the location of stairs, walls, and/or doors. As can readily be appreciated, many other types of data may be stored and utilized by the V-SLAM module 440 in order to map the operating environment of a mobile robot 100 as appropriate to the requirements of specific applications in accordance with embodiments of the invention.

As noted above, one or more classifiers 441 can be used to receive sensor information from the sensor system 420 and output information describing the content of the sensor information that may be used to actuate different behaviors of the mobile robot 100. In some embodiments, a classifier 441 receives one or more images from a machine vision system of the sensor system 420 and outputs information describing the content of the one or more images. In many embodiments, classifiers are utilized that can identify regions within an image corresponding to traversable floor or corresponding to obstacles and/or non-traversable floors.

In many embodiments, the programmed behaviors include a behavior 443 that causes the mobile robot 100 to seek out ground truth data for the content of images received from the machine vision sensor system of the mobile robot 100. By navigating to a region visible in one or more of the images, the mobile robot 100 can use other sensors to ascertain information concerning the characteristics of the region. In a number of embodiments, the mobile robot 100 can use bumper sensors and/or proximity sensors to detect the presence of an obstacle. In several embodiments, the mobile robot 100 can use a piezoelectric sensor, an accelerometer, IMU, and/or other sensor that provides information concerning the motion of the mobile robot 100 to determine whether a region of floor is traversable. The information acquired by the sensors describing a specific region visible within one or more images, for example a specific region corresponding to a group of pixels of similar area and texture perceived by the robot camera 125, can be used to annotate the one or more images and the annotated images can be added to the training database 445 of the classifier. The classifier can then be retrained. In many embodiments, retraining occurs periodically and/or upon the accumulation of a certain number of new images such as 100-200 images. In many embodiments, the classifier is constantly training such that descriptors are added to the training database 445 continuously and older images are deleted. In one embodiment, the floor database 350 and non-floor database 360 each contain 500 descriptors identifying samples of floor and non-floor, respectively. The descriptors are, for example, six digit numbers representing a sample of an image identified as floor or non-floor. In certain embodiments, the classifier generates a confidence score with respect to a specific classification and the confidence score can be utilized in determining whether to pursue a ground truth seeking behavior. In many embodiments, ground truth seeking behavior is stimulated in response to classifiers producing conflicting conclusions with respect to different images of the same region of the operating environment of a mobile robot 100.

In several embodiments, the classifier may be trained on a device external to the mobile robot 100, such as by an external server, and the trained classifier may be downloaded to the mobile robot 100 for execution. In particular, in these embodiments, the training data is stored and gathered by an external server that may collect training data from one or multiple mobile robots 100. The cumulative training data may then be used to train a classifier that is subsequently utilized by one or more individual mobile robot 100s to classify newly captured images acquired from within the mobile robot 100's operating environment.

In several embodiments, the navigation module 442 actuates the manner in which the mobile robot 100 is to navigate through an environment based on the characteristics of the environment. The navigation module 442 may direct the mobile robot 100 to change directions, drive at a certain speed, drive in a certain manner (e.g., wiggling manner to scrub floors, a pushing against a wall manner to clean sidewalls, etc.), navigate to a home charging station, and various other behaviors. Where V-SLAM data is available, the outputs of the classifier(s) 441 can be used to annotate maps developed by the V-SLAM module 440. In addition and/or alternatively, the classifier(s) can directly provide input(s) to a navigation module 442 that can be utilized in motion planning.

Other behaviors 430 may also be specified for controlling the behavior of the mobile robot 100. Furthermore, to make behaviors 440-443 more powerful, it is possible to chain the output of multiple behaviors together into the input of another behavior module to provide complex combination functions. The behaviors 440-443 are intended to implement manageable portions of the total cognizance of the mobile robot 100, and, as can be readily appreciated, mobile robots 100 can incorporate any of a variety of behaviors appropriate to the requirements of specific applications in accordance with embodiments of the invention.

Referring again to FIG. 4, the control arbitrator 450 facilitates allowing modules 440-443 of the programmed behaviors 430 to each control the mobile robot 100 without needing to know about any other applications. In other words, the control arbitrator 450 provides a simple prioritized control mechanism between the programmed behaviors 430 and resources 425 of the robot. The control arbitrator 450 may access behaviors 440-443 of the programmed behaviors 430 and control access to the robot resources 460 among the behaviors 441-443 at run-time. The control arbitrator 450 determines which module 440-443 has control of the robot resources 460 as required by that module (e.g. a priority hierarchy among the modules). Behaviors 440-443 can start and stop dynamically and run completely independently of each other. The programmed behaviors 430 also allow for complex behaviors that can be combined together to assist each other.

In many embodiments, the robot resources 460 may be a network of functional modules (e.g., actuators, drive systems, and groups thereof) with one or more hardware controllers. The commands of the control arbiter 450 are typically specific to the resource to carry out a given action.

Although specific robot controllers and behavioral control applications are described above with respect to FIGS. 1-4, any of a variety of robot controllers can be utilized including controllers that do not rely upon a behavioral based control paradigm as appropriate to the requirements of specific applications in accordance with embodiments of the invention. The training of one or more classifiers using training data acquired by one or more mobile robots 100 in accordance with various embodiments of the invention is discussed further below.

Training a Classifier Using Training Data Generated by a Mobile Robot

Mobile robots that utilize supervised machine learning to classify images captured by machine vision sensor systems may use ground truth training data to train the one or more classifiers. The ground truth training data may be collected using various mechanisms, including being pre-loaded prior to a mobile robot's 100 operations and/or collected during navigation of the mobile robot 100 through an operating environment. As can be readily appreciated, by training one or more classifiers using training data specific to the operating environment of the mobile robot 100, the classifier may be able to increase the accuracy by which the one or more classifiers are able to classify images. Classification of images can be useful for the purpose of detecting obstacles and determining whether floor/terrain is navigable. However, classifiers can be utilized for any of a variety of purposes including (but not limited to) face detection, face recognition, object detection, and/or object recognition.

Figure 5:
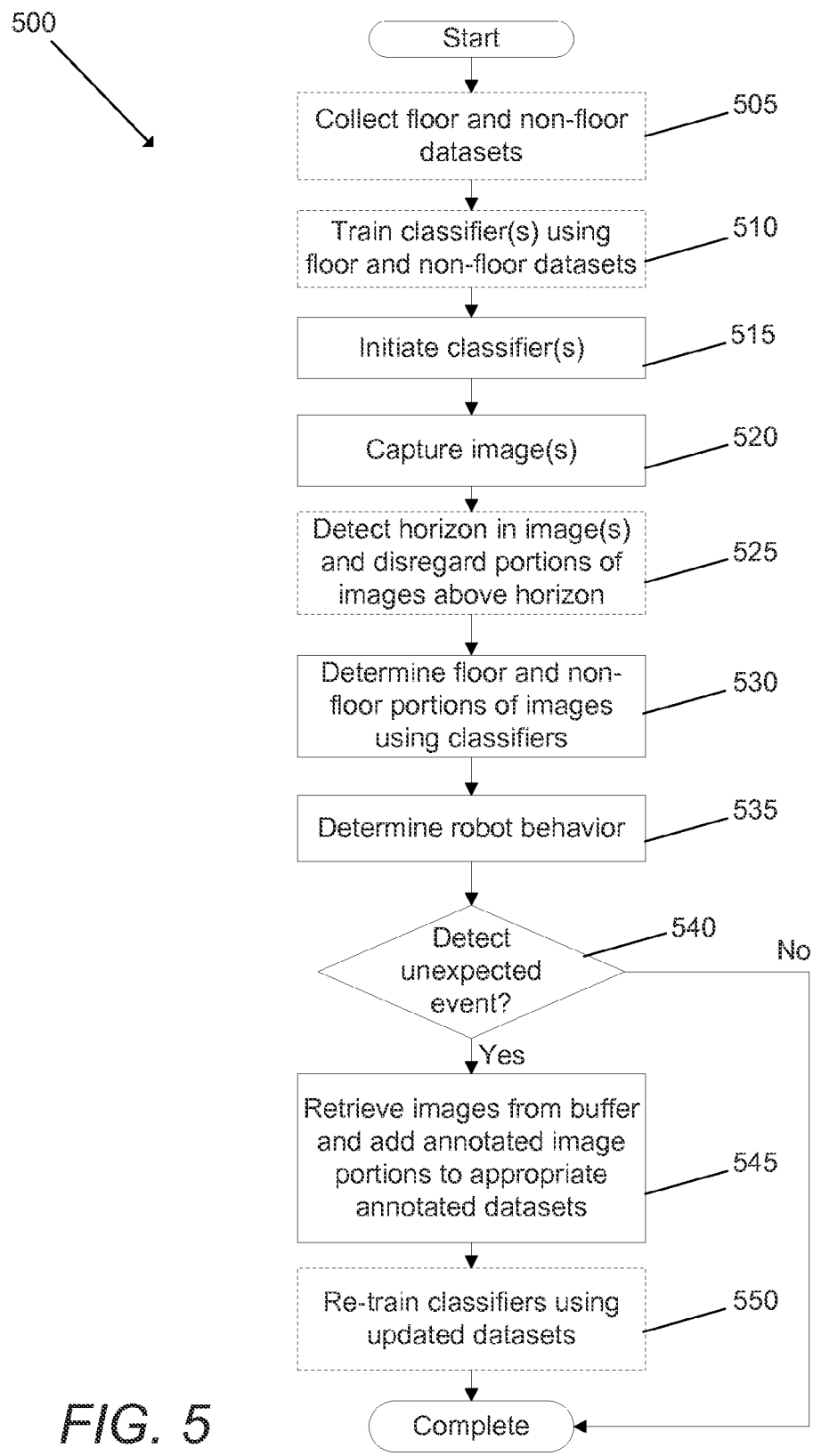
FIG. 5 is a flow chart illustrating a process for improving the performance of a classifier by capturing images from within the operating environment of the mobile robot and annotating the images with ground truth information determined by the mobile robot.

A process for training one or more classifiers using training data acquired during exploration of an operating environment by a mobile robot 100 in accordance with an embodiment of the invention is conceptually illustrated in FIG. 5. The process 500 optionally involves collecting (505) a set of training data. In the illustrated embodiment, the training data is shown as including floor and non-floor datasets. In other embodiments, any of a variety of training data can be provided as appropriate to the requirements of specifications. This training data may include pre-loaded training data that is not specific to the operating environment of the mobile robot 100. For example, a manufacturer of the mobile robot 100 may pre-load training data of various annotated images. These images may have been collected, for example, by a source external to the mobile robot 100 and loaded during a manufacturing stage of the mobile robot

100. The ground truth regarding the training data may have been established using, for example, a human classifier. In some embodiments, the ground truth may have been established using other techniques, including using automated computer recognition. The training datasets may include numerous images (e.g., thousands to millions of images) that have been annotated as corresponding to characteristics including (but not limited to) regions corresponding to floors and/or obstacles (e.g., the ground truth regarding the image).

One or more classifiers are (optionally) trained (510) using supervised machine learning techniques (510) similar to those described above. The training process can attempt to define a process or transformation that is able to map a set of inputs, such as a combination of sensor inputs including a camera sensor 125 and a bumper sensor 115, to a corresponding set of classification outputs, such as a patch of pixels captured by the camera sensor 125 and corresponding to floor and non-floor as determined by the bumper sensor 115. For example, if the input is an image that contains an obstacle at a particular location, the classifier should be able to correctly output a determination that an obstacle exists at the particular location within the image and thus provide an output that matches the ground truth of the image. In a number of embodiments, the machine learning process verifies that the outputs of the classifier match the ground truths of the inputs. The machine learning process may continuously iterate through the training data until the one or more classifiers are able to correctly classify images in the training datasets with a predetermined level of certainty. For example, after a classifier has been able to accurately classify a certain threshold percentage (e.g., 90%, 99.9%, etc.) of the training data, the training of the classifiers may be stopped since the classifiers are now able to achieve a certain requisite level of accuracy with respect to the training datasets. As is discussed further below, the mobile robot 100 can retrain the classifiers in response to detection of unexpected events. An unexpected event may be, for example, the robot bumper 115 registering a collision when no pixel patch of interest was being tracked in a series of image frames produced by the camera sensor 125. In this way, the performance of the classifier within the mobile robot 100's operating environment can be improved over time.

The process 500 initiates (515) the classifier on the mobile robot 100. During navigation, one or more images of the surrounding environment are captured (520). In many embodiments, a machine vision sensor system is used to obtain the images. The machine vision sensor system may include one or more cameras configured to capture scenes of the environment that are directly in the driving path of the mobile robot 100. In other embodiments, cameras may be placed in other configurations, such as mounted on top of the mobile robot 100 and the lenses may be positioned at various angles that enable that mobile robot 100 to capture a view of the driving path directly in front of the mobile robot 100. In some embodiments, the lens of the camera may be a wide angle or fish-eye type lens that may capture a larger portion of the periphery scenery along the sides, top and bottom of the mobile robot 100 as well the scenes directly in front of the mobile robot 100. The cameras may also be placed along the sides, top, and/or bottom of the mobile robot 100 in order to obtain other views of the surrounding environment.

The process 500 analyzes the image frames in order detect the characteristics of the surrounding environment. In some embodiments, for a particular image frame being analyzed, the process may (optionally) initially identify the horizon in the captured image and disregard the portions of the image above the horizon (525). By detecting a horizon, the process 500 may be able to automatically disregard all of the portions of the image that lie above the horizon, since these portions likely correspond to non-floor image data (e.g., walls, ceilings, and/or tables). This automatic disregard depends in part on the size of a room and the distance from which the robot 100 is taking an image. In smaller rooms, the portions of a frame above the image horizon will include more non-floor in every frame than in larger rooms when the robot 100 is backed away from the non-floor area by a longer distance. In some embodiments, the process assumes that the environment is a room in which no obstacle is more than 50 feet from the robot at any pose within the environment. When a mobile robot 100 is 50 feet from a non-floor image patch, the image patch may be above or below the horizon and no automatic disregard is possible for that particular patch. In other instances, any of a variety of processes can be utilized to disregard portions of frames as appropriate to the requirements of specific applications. By disregarding portions of the image, the process 500 is able to reduce the amount of image processing performed when analyzing images in order to detect obstacles and/or traversable floors. Other embodiments analyze the entire captured image, including portions of the image that lie above the horizon. For example, many embodiments of the invention utilize the portions of the image above the horizon in VSLAM processing.

Different techniques may be used to determine the location of a horizon in an image. Some embodiments may apply edge detection techniques that identify the presence of edges within an image. By detecting edges within an image, an edge may correspond to, for example, a location at which a wall and floor come together within the image. Typically, a horizon in an image is a straight line across the image, and edge detection techniques may be used to detect such edges within an image. In several embodiments, the horizon seen by the camera sensor 125 in an image frame is a location other than a wall to floor intersection depending on the distance of the robot 100 from the wall. In many embodiments, horizon detection processes utilize optical flow to track a horizon from one frame to the next as a mobile robot 100 moves to further refine horizon detection. Based on the detected horizon, one or more classifiers can be applied (530) to the image to identify the portions of the image, below the identified horizon, that correspond to traversable floor and/or the portions of the image that contain obstacles. In many embodiments, the process may also determine the location of obstacles relative to the position of the mobile robot 100. In particular, in some embodiments, the process may generate depth information regarding the locations of obstacles and floors within a captured image relative to the position of the mobile robot 100.

Based on the characteristics of the surrounding environment ascertained from one or more captured images, a robot behavior is determined (535). For example, if an obstacle is detected in the immediate path of the mobile robot 100, then the actuated behavior changes driving directions in order to avoid contact with the obstacle. Likewise, if traversable floor is detected in the immediate driving path of the mobile robot 100, then the mobile robot 100 actuates a behavior to drive while maintaining its current heading. Many possible behaviors may be actuated based on the characteristics of the surrounding environment and/or the state of the mobile robot 100.

During the actuation of a particular behavior, the mobile robot 100 may have a certain set of expectations regarding its surrounding environment based upon output(s) provided by the one or more classifiers. As can readily be appreciated, classifiers utilized in accordance with many embodiments of the invention can generate erroneous outputs that do not correspond to the ground truth of the environment. As a mobile robot 100 moves through its operating environment, the mobile robot 100 can collect ground truth information concerning its environment using its sensors. When an unexpected event occurs (540) involving the detection of a ground truth for a particular region that does not correspond with information generated by a classifier based upon an image of the region, the mobile robot 100 can retrieve (545) one or more images from an image buffer and annotate incorrectly classified image(s) and or image portion(s) and add the annotated image(s) and/or image portion(s) to an appropriate training dataset. The updated training dataset can then be utilized in the retraining (550) of the classifier that incorrectly classified the image portion. By way of example, if a classifier indicates that traversable floor is directly in front of a mobile robot's 100 driving path, then the mobile robot 100 may drive under the assumption that it will not collide with any obstacles. In this state of operation, detecting, for example, a sensor bump would be an "unexpected event." The mobile robot 100 can retrieve the incorrectly classified image and determine a portion of the image corresponding to the distance at which the bump was detected. The annotated image can then be added to an non-floor training dataset 360 and used to retrain the classifier used to detect the presence of traversable floor.

FIGS. 10A-14B show examples of training a classifier for distinguishing traversable floor and non-traversable, non-floor using an image sensor 125, such as a downward tilted camera that has the space ahead of the robot in its field of view, and a bump sensor 115 (herein also called "bumper 115") on a mobile robot 100, such as the mobile robot 100 of FIGS. 1 and 2. The camera 125 equipped robot 100 uses machine learning to learn what is traversable floor and what is non-traversable non-floor by identifying patches of colors and textures in image frames stored in a buffer and categorizing those identified colors and textures associated with traversed space as floor F and those identified colors and textures associated with non-traversable space as non-floor NF. As mentioned above, in some embodiments, the mobile robot 100 is selectively in training mode (e.g. training the classifier), and in other embodiments, the mobile robot 100 is continuously in training. During continuous training mode, the machine learning processes are continuously training classifiers and classifying portions of images based on mobile robot 100 movements and events that indicate whether patches of pixels are associated with traversable floor F or non-traversable non-floor NF.

In one embodiment, while operating in training mode, the mobile robot 100 tracks pixel patches representing potentially interesting areas for classification and buffers images in a storage buffer so that the tracked patches are either classified as floor F or non-floor NF depending on whether the mobile robot 100 traverses the patch or detects an object with a proximity sensor, bump sensor, cliff sensor or any other visual or mechanical obstacle detection sensor. In one implementation, the "objects" tracked by the mobile robot 100 are patches of pixels distinguished by color and/or texture from the surroundings, and the robot 100 determines, based on the presence or absence of triggering of the bumper 115, whether those patches belong to the traversable floor group of colors and/or textures or the non-traversable, non-floor group. In several embodiments, the robot 100 updates the classifier even when not tracking a patch of pixels that might be part of the non-traversable floor (e.g. obstacle) group.

The robot movement case scenarios of FIGS. 10A-10F and the flowcharts of FIGS. 11-14B demonstrate embodiments of different classifier training scenarios of how the mobile robot 100 can learn to distinguish pixel data representing floor F from pixel data representing non-floor NF and accordingly store this classified data in either the trainer Floor Dataset 350 or the trainer Obstacle (non-floor) Dataset 360. The term horizon H is used in the flowcharts of FIGS. 11-13B to mean exactly what horizon means—a horizontal line in the distance where a top region of an image frame meets a bottom region of an image frame, much like a human eye perceives a horizon H where sky meets earth. So, in other words, the camera 125 on the mobile robot 100 will typically see a horizon H provided that the mobile robot is operating in an environment in which a horizon is visible. With a downward tilted camera in a large space, a horizon may not always be visible within the field of view of the camera 125 of the mobile robot 100. The top of an image frame above the horizon H is non-floor for a standard sized room, or a room less than 50 feet in length, and the portion of the imagine frame below the horizon H contains patches of pixels that may be floor or non-floor. For example, an image frame taken while the robot 100 is within inches of a wall will include wall below and above the horizon H in the image frame, and the robot 100 will need to learn that a sample of pixels is floor F or non-floor NF based on sensor events and/or comparisons to base images taken earlier at distances further from the wall that included identified traversable floor F space. As the robot 100 approaches potential obstacles, algorithms update the classifier trainer datasets 350, 360 depending on events, such as a robot bump sensor triggering and indicating collision with an obstacle, the location of which is non-traversable floor NF.

Once trained, the classifier enables the robot 100 to avoid a collision with a seen real obstacle. As depicted in the sequential boxes of FIG. 10A that show a sequential series of robot poses, a mobile robot 100 moves toward a real obstacle 1005 seen by the camera 125 in boxes 1001 and 1002, and avoids collision by reversing direction in box 1003 and moving away from the obstacle 1005 as shown in box 1004.

As depicted in the embodiment of FIGS. 100 and 11, the classifier includes a false negative trainer algorithm 1100 that identifies false traversable space upon collision with an unexpected obstacle 1015. When an unexpected collision occurs, the false negative trainer algorithm 1100 looks back a few frames in the image buffer and classifies pixel samples from above and below the horizon H to identify non-traversable space, or obstacle, non-floor NF samples and traversable floor F samples.

Figures 11A, 11B:
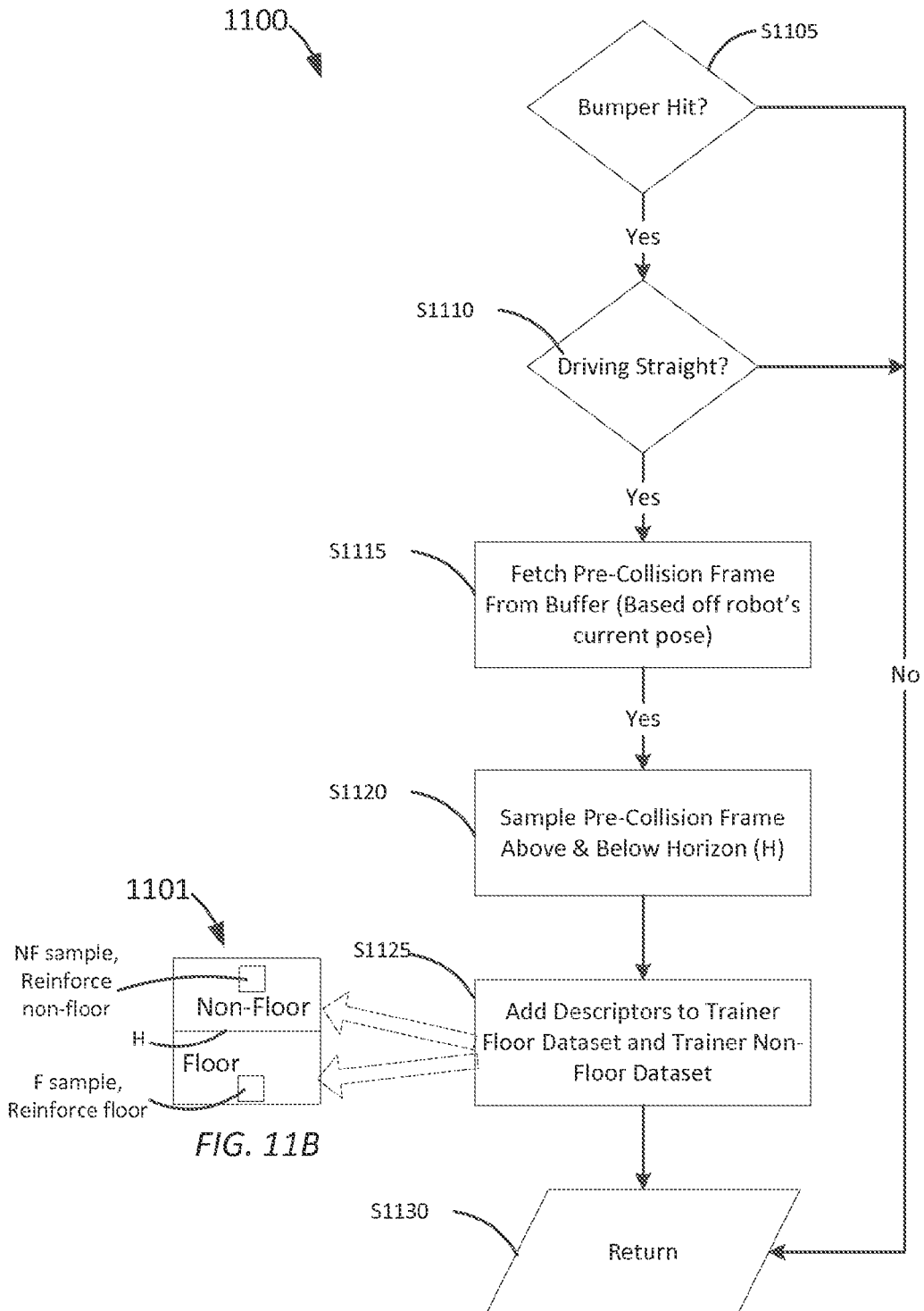
FIG. 11A is a flow chart illustrating a process for a false negative training algorithm.
FIG. 11B is a schematic illustrating sampling non-floor and traversable floor samples from a pre-collision frame.
Figure 12:
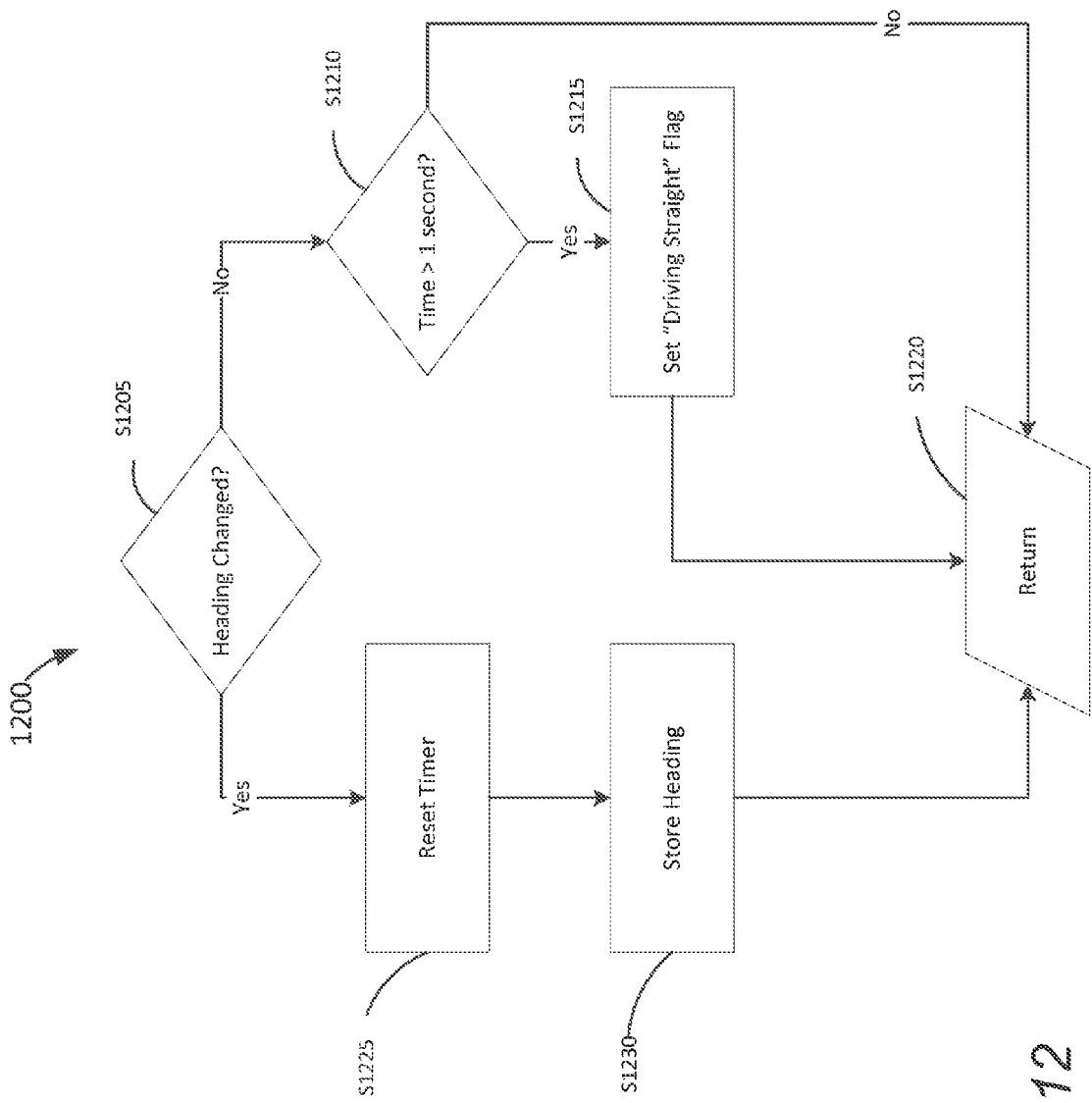
FIG. 12 is a flow chart illustrating a driving straight routine for determining if the heading of a mobile robot 100 has changed.

As indicated in the embodiment of FIGS. 10C, 11A and 11B, the robot 100 is traveling along and not tracking any interesting pixel samples, such as colored blobs or patterns, that might represent obstacles. The mobile robot 100 is not expecting to hit a non-floor NF, non-traversable obstacle 1015. If the mobile robot 100 does not hit an obstacle and register S1105 a bumper hit, the false negative trainer algorithm 1100 returns 81130 to the start, and no descriptors are added to the Trainer Floor dataset 350 or Trainer Non-Floor dataset 360. If the robot 100 registers S1105 a bumper hit, the algorithm 1100 checks S1110 whether the robot 100 is driving straight and then fetches S1115 the pre-collision image frame 1101 from the image buffer. The pre-collision image frame 1101 is the frame taken immediately before the current pose of the robot 100. The algorithm samples S1120 the pre-collision image frame above the horizon H to identify a pixel sample that is definitely non-floor NF and below the horizon H that is definite representative of floor F because the frame was taken pre-collision. Because an obstacle can extend down below the horizon for a substantial distance in an image frame, the floor F sample is taken from the very bottom of the pre-collision frame to insure that the pixel sample is representative of true floor F. The false negative trainer algorithm 1100 adds S1125 descriptors to the trainer Floor and Non-Floor datasets before returning S1130 to an initial state. The descriptors added to the Floor dataset 350 and Non-Floor dataset 360 may be a set of numbers or other databits or metadata that identify sampled patches of images as traversable space F and non-traversable space NF. In one embodiment, a descriptor is a series of 6 numbers, and the Floor dataset 350 and the Non-Floor dataset 360 each retain up to 500 examples of floor F and 500 examples of non-floor obstacles NF, respectively. The false negative trainer algorithm 1100 uses a circular buffer to collect potential training data descriptors while deciding whether to classify the descriptors as floor F or non-floor NF data in the classifier trainer datasets 350, 360. New data is constantly coming into the buffer and unclassified descriptors are relinquished. In embodiments, the buffer is large enough and holds enough data to prevent erroneous, false negative classifications. The larger the buffer, the less likely false negatives will be trained into the classifier, and the classifier data will be more accurate.

The false negative training process 1100 and other training algorithms reply upon determining that the robot 100 is driving straight and toward a location captured in one or more buffered image frames. The flowcharts of FIGS. 11 and 13A-14B use the driving straight routine 1200 of FIG. 12 to determine whether the robot 100 is driving straight. This driving straight algorithm 1200 determines if the robot 100 has been holding its heading within an allowable tolerance range for at least the last one second. The algorithm 1200 starts by determining S1205 whether the heading of the robot 100 has changed. If the heading has changed, the algorithm resets S1225 the timer and stores S1230 the new heading of the mobile robot 100 before returning 1220 to the start of the algorithm 1200. If the heading has not changed, the algorithm determines S1210 if the heading has been maintained for at least one second. If the heading is maintained for at least one second, the algorithm sets S1215 a "driving straight" flag. If the heading is not maintained for at least one second, the algorithm returns S1220 to the start to check S1205 again whether the robot 100 is currently maintaining a heading.

In several embodiments, this driving straight algorithm 1200 is used as an input into the various training processes because training on images from the past is reliable only if the heading of the moving robot 100 is constant. This requirement greatly simplifies the correlation between robot pose and camera image. In a number of embodiments, however, in which the mobile robot 100 has a reliable localization technique for correlating robot pose with camera image, such as VSLAM, executing the driving straight algorithm 1200 is not necessary for executing training algorithms.

As depicted in the embodiment of FIGS. 13A-13C, the classifier includes a true negative trainer algorithm 1300 that identifies patches of a frame that represent truly traversable floor. As the robot 100 drives in an unimpeded straight line, or a heading that wavers by less than plus or minus 3 cm, the algorithm 1300 looks back at a base image 1301 taken by the camera 125 when the current heading of the robot 100 was first established. From that base image, the true negative trainer algorithm 1300 samples S1325 some floor F pixel patches at the distance into the image corresponding to the current location of the robot 100. The true negative trainer algorithm 1300 also samples S1330 obstacle data by looking above the horizon in an image taken at the current position of the robot 100 and classifying a pixel patch at the top of the frame as non-traversable, non-floor NF.

The embodiment of FIG. 13A provides a routine for the true negative trainer algorithm 1300. The robot is traveling S1305 and driving along a straight heading. The true negative trainer algorithm 1300 checks S1310 whether the heading has changed. If the heading has changed, the true negative trainer algorithm 1300 stores S1340 a new base pose, stores S1345 the current frame in the index buffer as the "base image" and then returns S1335 to the start of the true negative trainer algorithm 1300. Each time the heading of the moving robot 100 changes, the true negative trainer algorithm 1300 resets the image buffer as the base image. If the robot heading does not change, the true negative trainer algorithm 1300 looks 1315 at the distance "d" the robot 100 has moved since the image buffer was last initialized, where d equals the current pose of the robot 100 minus the base pose. The true negative trainer algorithm 1300 considers, based on a threshold for "d", whether the robot 100 has moved enough since the last sample and therefor is ready to sample S1320. For example, in embodiments, the threshold distance d the robot may need to move before the true negative trainer algorithm 1300 samples an image may be at least 0.5-12 inches. If the robot 100 is not ready to sample, the algorithm 1300 returns S1335 to the start. If the robot 100 has moved enough, the true negative trainer algorithm 1300 is ready to sample. As depicted in FIGS. 13A and 13B, the true negative trainer algorithm 1300 samples S1325 patches of floor F at a distance "d" in the base image 1301. The trainer, therefore, is classifying that space travelled over by the robot 100 as traversable floor F and thereby reinforcing what is a floor F sample. As depicted in FIGS. 13A and 13C, the robot 100 also samples S1330 objects above the horizon in the current image 1302, reinforcing in the trained dataset the classifier for a non-floor NF sample.

Figure 14A:
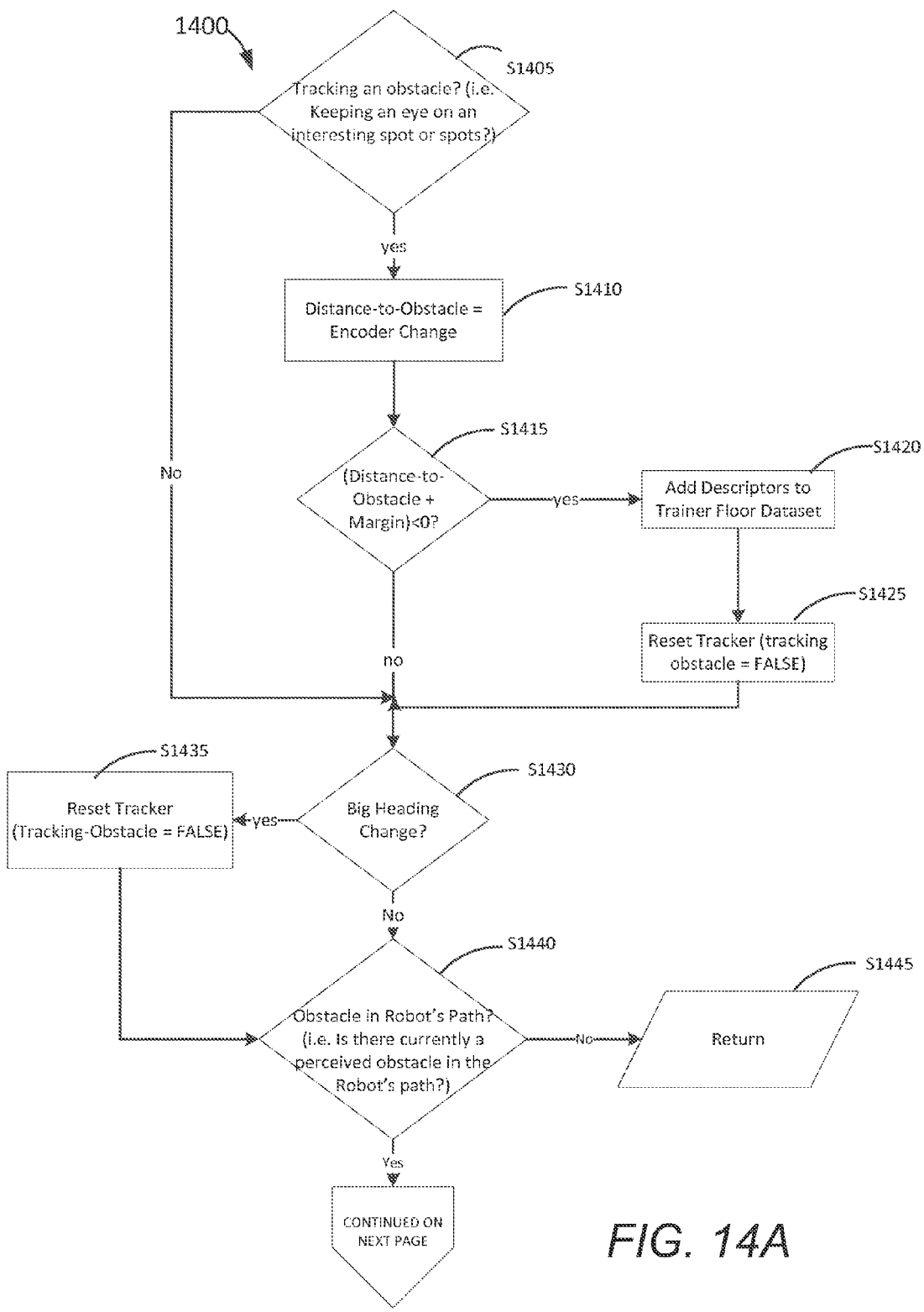
FIG. 14A is a flow chart illustrating a false positive trainer algorithm.
Figure 14B:
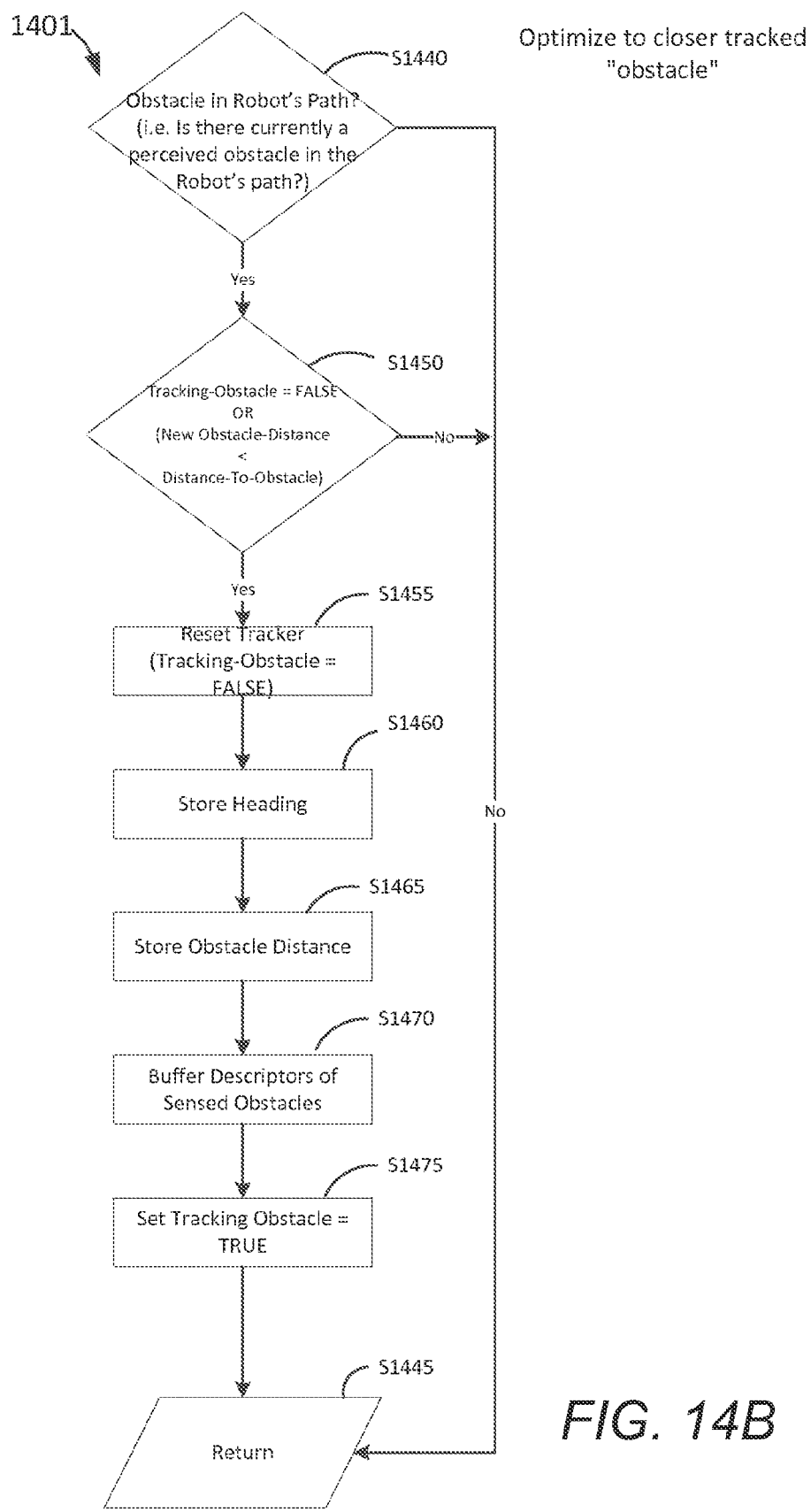
FIG. 14B is a flow chart illustrating a optimization routine for tracking a closest pixel patch of interest.

The embodiment of FIGS. 14A-14B provides a routine for the false positive trainer algorithm 1400 that addresses the detection of an assumed obstacle that doesn't really exist and an optimization routine 1401 for tracking the closest perceived obstacle.

As depicted in FIGS. 10F and 14A, while driving, the robot 100 keeps track S1405 of one or more patches of an image, such as a patch in an image that contains the nearest perceived obstacle 1030 and a patch that contains the next nearest seen obstacle 1035. If the belief changes because the robot 100 perceives that the obstacle 1030 disappeared, then the patch in question will be entered into the Trainer Floor dataset 350 as floor training data once the robot 100 has reached the spot on the floor F corresponding to the patch where the nearest perceived obstacle 1030 would have been and has detected no obstacle via collision induced bump sensing or proximity detection with time of flight or structured light optical sensing. In FIG. 10F, in the first box 1026, the robot 100 perceives a close obstacle 1030. In the next box 1027, the robot 1000 perceives the next nearest seen obstacle 1035 and no longer perceives the nearest perceived obstacle 1030, as depicted in box 1028. The false positive trainer algorithm 1400 adds a false positive to the classifier data before the robot 100 tracks the next nearest seen obstacle 1035.

FIGS. 10B, and 10D-10F further exemplify false positive scenarios. In FIG. 10B, the robot 100 perceives a false obstacle 1010 in the first box 1006. In the second box 1007, the robot 100 reaches the patch occupied by the false obstacle 1010. In the third box 1008, the robot 100 moves beyond the patch occupied by the perceived obstacle 1010, and the algorithm 1400 determines that the robot 100 has falsely detected an obstacle and adds false positive data representative of the appearance of the falsely perceived obstacle 1010 to the classifier training data for the Trainer Floor dataset 350.

In FIG. 10D, the robot 100 thinks it sees an obstacle 1020 from a distance in the first sequential box 1016, but in the second box 1017 and third box 1018, the obstacle 1020 disappears. The false positive trainer algorithm 1400 determines that the robot 100 has falsely detected an obstacle and adds false positive data representative of the appearance of the falsely perceived obstacle 1020 to the classifier training data.

In FIG. 10E, much like FIG. 10B, the robot 100 perceives a false obstacle 1025 in the first box 1021, but stops perceiving this false obstacle 1025 in the second sequential box 1022. The perceived obstacle 1025 is perceived again in the third box 1023. In the fourth sequential box 1024, the robot 100 moves beyond the patch occupied by the perceived obstacle 1025. The false positive trainer algorithm 1400 determines that the robot 100 has falsely detected an obstacle and adds false positive data representative of the appearance of the false obstacle 1025 to the classifier training data. This false obstacle could be, for example, one or more patches of sunlight moving across the floor.

Returning to FIG. 14A depicting an implementation of the false positive trainer algorithm 1400, the robot 100 is traveling along tracking S1405 an obstacle. For example, the robot 100 might be keeping an eye on a spot of interest, like a big green blob representing a perceived obstacle patch in an image frame. The false positive trainer algorithm 1400 determines S1410 the distance to the perceived obstacle corresponding to the expected change in a wheel encoder, and determines whether the robot 100 has reached the location of the supposed obstacle patch based on the calculated distance to the obstacle being less than zero. The false positive trainer algorithm 1400 first determines S1410 whether the encoder change is equal to the distance to the obstacle to see if the robot has arrived at the obstacle patch location and then determines S1415 whether that distance plus a margin is less than zero. If the distance traveled to the obstacle plus a margin is less than zero, this indicates that the robot 100 has driven through the supposed obstacle and that the interesting patch that the robot 100 was tracking represents traversable floor F. This creates more new training data for what is a false obstacle, and the algorithm adds S1420 descriptors to the Trainer Floor Dataset 350.

The algorithm then resets S1425 the tracker, erasing obstacle tracking, and determines S1430 whether the robot 100 is experiencing a big heading change. If the robot senses a big heading change, the false positive trainer algorithm 1400 resets S1435 the tracker, indicating that the robot 100 is not tracking anything of interest. If the tracker is reset or if the robot 100 does not sense a big heading change, the algorithm 1400 determines S1440 whether a perceived obstacle currently exists in the path of the robot 100. If no obstacle is perceived, the algorithm returns S1445 to the start.

In one embodiment, if more than one perceived obstacle appears along the heading of the robot 100, the optimization routing 1401 resets tracking and ensures that the robot 100 is tracking S1440 the closest perceived obstacle. The optimization routine 1401 checks S1450 whether a newly perceived obstacle is closer to the robot 100 than a perceived obstacle that the system is currently tracking. If the perceived obstacle is the closest perceived obstacle to the robot 100, then the tracker resets 1455 to register that the robot 100 is not tracking an obstacle. The optimization routine 1401 stores S1460 the heading of the robot 100, and stores S1465 distance to the nearest obstacle. At step 1470, the optimization routine 1401 buffers descriptors of the perceived obstacles, namely the nearest perceived obstacle. The buffered descriptor or descriptors are the proposed new training data for the Trainer Floor Dataset 350. The optimization routine 1401 sets S1475 the obstacle tracker TRUE, because a perceived obstacle is now being tracked, namely the obstacle nearest to the robot 100 along the heading of the robot. The optimization routine 1401 therefore ignores obstacles far away from the robot 100 and tracks the nearest perceived obstacle.

By continuously updating the training datasets, the process is able to provide better training data for use in supervised machine learning process used to train the classifier(s). Furthermore, as can be readily appreciated, updating the training data with images from the actual operating environment may help increase the accuracy of the classifiers. In several embodiments, the classifiers may be retrained on a periodic basis, such as at a certain times of day, or during periods when the mobile robot 100 is in a particular state (e.g., mobile robot 100 is docked at a charging station, mobile robot 100 is connected to an electric power source, and/or the mobile robot 100 has sufficient processing resources available). In some embodiments, training of the one or more classifiers may be automatically triggered anytime an update to the training datasets is made. In several embodiments, the updated datasets may be provided to an external computing device via a network data connection and one or more classifiers may also be trained remotely and provided to the mobile robot 100 via the network data connection. For example, the mobile robot 100 may utilize an Internet connection to communicate with external servers that handle the collection of training data and the training of the classifiers. As can readily be appreciated, new classifiers can be trained by any supervised machine learning system using updated training data including (but not limited to) supervised machine learning systems implemented on mobile robot 100s, and/or supervised machine learning systems implemented on remote servers.

Although specific processes for training classifiers using training data collected from an environment of a mobile robot 100 are described above with reference to FIG. 5, any of a variety of processes may be utilized for training classifiers using training data collected from an environment of a mobile robot 100 as appropriate to the requirements of specific applications in accordance with embodiments of the invention. Furthermore, similar processes can be utilized to annotate portions of images or features extracted from images with ground truths for use in classifiers that perform classification based upon examples and/or templates, such as (but not limited to) nearest-neighbor classifiers. Accordingly, it should be appreciated that any of a variety of processes for capturing images, navigating a mobile robot 100 to a region visible within an image, and annotating an aspect of the image with ground truth determined using sensors present on the mobile robot 100 can be utilized as appropriate to the requirements of specific applications in accordance with embodiments of the invention. Techniques for collecting training data from an environment are discussed further below.

Collecting Ground Truth Training Data while Navigating an Operating Environment

Mobile robots in accordance with many embodiments of the invention can continuously collect training data while operating within an environment by capturing images of different regions and establishing ground truth for portions of the captured images by exploring the regions and collecting sensor data. As noted above, the annotated images can be used as training data in a supervised machine learning process to train a classifier and/or the annotated images could be directly utilized in a classification process.

Figure 6:
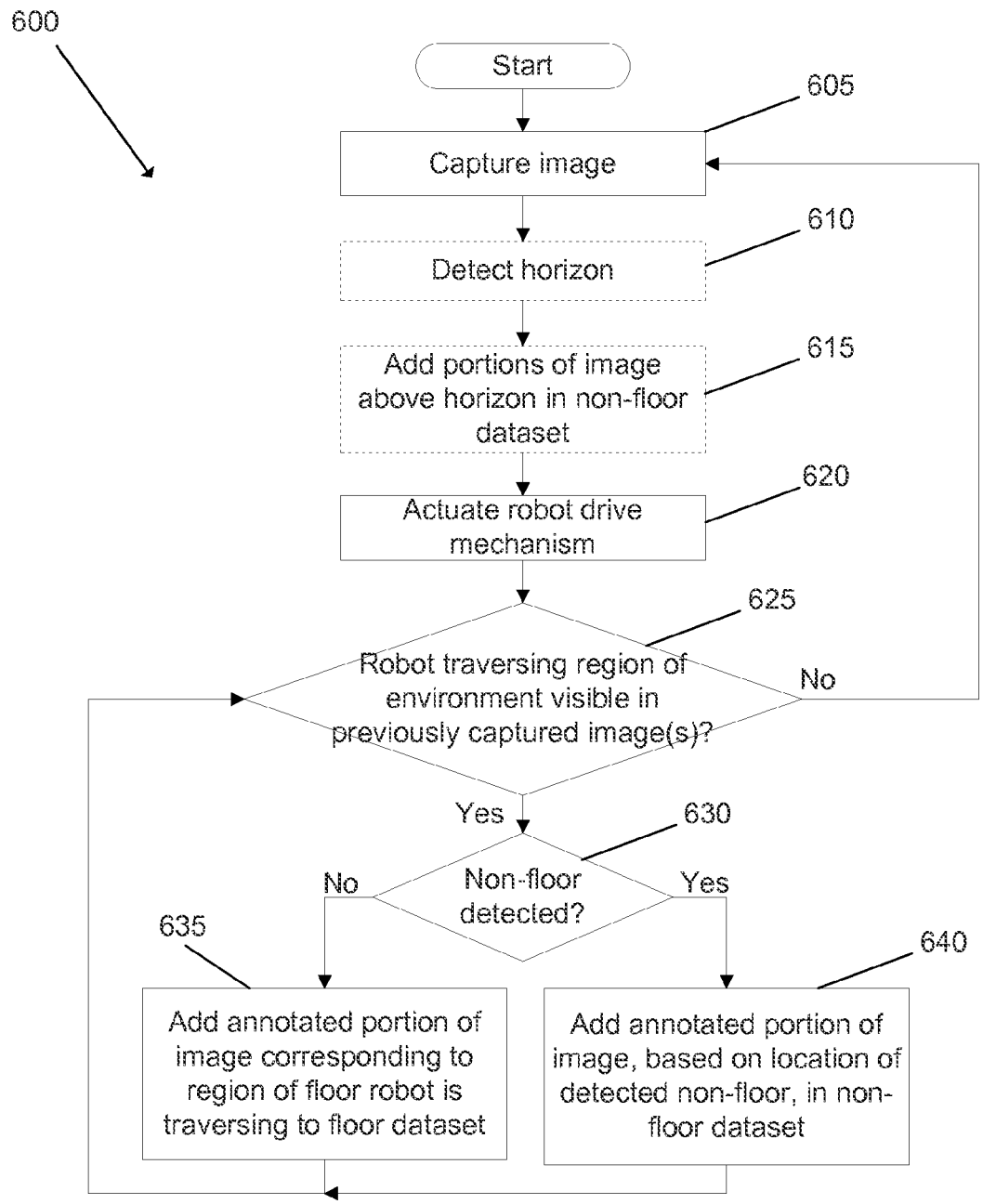
FIG. 6 is a flow chart illustrating a process for obtaining ground truth information for a previously classified image using a mobile robot.

A process for collecting ground truths with respect to regions visible within captured images as a mobile robot 100 navigates through an environment is illustrated in FIG. 6. The process (600) involves obtaining (605) one or more images via a camera 125 on the mobile robot 100. As described above, an image may include a view of the environment surrounding the mobile robot 100. In some embodiments, the image includes a view of the scene directly in the path of the mobile robot 100. In other embodiments, the image and/or other images obtained by the mobile robot 100 may capture views of other portions of the surrounding environment.

Analysis of a captured image can (optionally) involve detecting (610) a horizon within the captured image. As described above, the horizon may be detected using various techniques, including (but not limited to) preforming edge detection and/or analyzing an edge map generated using the captured image. In many embodiments, identification of a horizon can be verified using sensors that are able to detect the boundaries of an environment, and thus the horizon may be detected based on the location of the boundaries relative to the position of the mobile robot 100.

Based on the location of the horizon, the process (600) may automatically annotate the portions of the image above the horizon as corresponding to non-floor image data and update the non-floor dataset with this image data (615). In many embodiments, the process may completely disregard the portions of the image that lie above the horizon and not use these portions within the training datasets. In several embodiments, the portion of the image lying above the horizon can be utilized in other processes, such as (but not limited to) VSLAM processes.

In many embodiments, the annotated image portions used by the classifiers and/or in the training of the classifiers include portions of images that capture views above or below the horizon. In several embodiments, the process may separate the image portions into sets including a set of images portions capturing views above the horizon that correspond to non-floor image data, a set of image portions that lie below the horizon that correspond to traversable floor image data, and a set of image portions that lie below the horizon that correspond to non-traversable floor (e.g., obstacles). In other embodiments, classifiers can use sets of annotated image portions that contain only image portions that capture views below the horizon.

In some embodiments, during image capture, the mobile robot 100 may annotate the image with various types of data that may be used when analyzing the images. In some embodiments, the data may be in the form of metadata associated with the image, and can include information that describes, among other things, the pose of the mobile robot 100 at the time the image was obtained, the time at which the image was obtained, a depth map of the image, the camera settings used to obtain the image, and/or various other information. This information may then be used when determining "ground truths" for different portions of the captured image. As described above, a ground truth defines the characteristics that are actually present within a portion of a captured image. In many embodiments, the ground truth establishes a truth regarding whether a portion of a captured image corresponds to traversable floor or to non-traversable floor (e.g., floor that contains an obstacle, a cliff, or a surface that is not traversable by the mobile robot 100).

In order to establish a ground truth for a particular image, the process may determine whether the mobile robot 100 is currently traversing a region visible in one or more previously obtained images (625). When the environment directly in the path of the mobile robot 100 is captured by an image, then the mobile robot 100 may travel through regions of the operating environment corresponding to portions of the scene visible within the image by maintaining the same (or similar) driving direction. If the mobile robot 100 camera 125 obtains an image and then changes its direction of travel, then the mobile robot 100 may not immediately travel through any portion of the scene visible within the image. In a number of embodiments, the camera-equipped mobile robot 100 can maintain a map of the operating environment using a technique such as (but not limited to) V-SLAM. The mobile robot 100 can associate portions of images with regions of the map. In this way, the mobile robot 100 can determine image portions corresponding to the ground truth for a particular region of the map and annotate the relevant image portions, the robot map, and any user facing map, such as a map of an environment showing traversable floor, non-floor and incremental coverage by the mobile robot 100. In this way, the mobile robot 100 need not be constrained to only annotating image portions when the mobile robot 100 captures images and moves in a straight line. When the process determines that the robot is not traversing a section of the floor that is visible in any previously captured image, the process can acquire sensor data that can be utilized to annotate images of the region subsequently captured by the mobile robot 100 and/or can obtain (605) one or more new images.

In some embodiments, a buffer of captured images is maintained by a mobile robot 100 and portions of images corresponding to regions traversed by the mobile robot 100 can be retrieved from the image buffer, annotated, and utilized in the operation and/or training of one or more classifiers. In many embodiments, the buffer is a first in first out (FIFO) buffer such that, upon capturing a new image, the oldest image is purged from the buffer. In embodiments where the mobile robot 100 does not maintain a map of its operating environment, the image buffer can be purged anytime the mobile robot 100 changes driving directions. In other embodiments, any of a variety of criteria appropriate to the requirements of specific applications can be utilized to manage the images within the image buffer.

When a determination (625) is made that the mobile robot 100 is traversing a region of the environment that is visible in one or more portions of one or more previously captured images, then a further decision (630) can be made concerning whether the region of the environment is traversable and/or whether an obstacle and/or some other hazard is present. In particular, one or more of the sensors of the mobile robot 100 may be used to determine whether the mobile robot 100 is traveling across traversable floor and, when an obstacle is present, the sensors may establish a ground truth regarding an actual presence of the obstacle.

When the process determines that the region of the environment is traversable (for example, the sensor outputs received from a bumper sensor and/or a proximity sensor indicate the absence of obstacles, a piezo sensor indicates that the mobile robot 100 is traversing a relatively smooth surface, and/or a drop sensor indicates that the mobile robot 100 is traversing a relatively level surface), the process may annotate the portions of the previously captured images that correspond to the particular region of the environment successfully traversed by the robot as corresponding to traversable floor. The newly annotated image(s) and/or image portion(s) can then be added to a traversable floor dataset and the process 600 can return to determining (635) whether the robot is still traversing portions of any of the previously captured images and/or capturing (605) additional images.

When the process determines (630) that an obstacle is present and/or that the floor is otherwise non-traversable, the one or more portions of the one or more captured images in which the region of the environment is visible can be annotated as corresponding to the presence of an obstacle and/or non-traversable floor and added (640) to the Non-Floor dataset 360. In a number of embodiments, the presence of an obstacle can be determined (630) using one or more bumper sensors positioned along the body 103 of the mobile robot 100. In several embodiments, the process may use information received from other types of sensors in order to establish the presence of an obstacle including (but not limited to) infrared sensors, and/or sonar sensors. The presence of non-traversable floor can be detected using sensors such as (but not limited to) piezo sensors, accelerometers, gyroscopes and/or cliff sensors. The specific sensors utilized to establish ground truths are typically dictated by the requirements of particular mobile robotics applications. Once the image(s) and/or image portion(s) are annotated and added to data sets, the process 600 can continue determining grounds truths (625) and/or acquiring additional images of the operating environment. Although specific processes for collecting ground truth corresponding to specific images and/or image portions during navigation are described above, any of a variety of processes may be utilized for collecting ground truth information for annotating images and/or image portions as appropriate to the requirements of specific applications in accordance with embodiments of the invention.

Using Confidence Scores to Trigger Collection of Ground Truth Data

Classifiers utilized by mobile robot 100s in accordance with many embodiments of the invention generate confidence scores that provide a quantitative measure regarding the likelihood that the classifiers have accurately classified the content contained within different portions of a captured image. In several embodiments, the confidence scores can be utilized to activate a behavior within the mobile robot 100 to attempt to establish ground truths for one or more portions of an image. A threshold on the confidence score can be utilized to determine whether a classification is reliable. When a confidence score indicates a low reliability classification of the content of a portion of an image (i.e. the confidence score is below a threshold), then the robot controller can perform route planning to navigate the mobile robot 100 to the region of the environment corresponding to the unreliably classified image portion and collect ground truth information using the mobile robot 100's sensor system. In this way, the mobile robot 100 can seek out training data and/or annotated examples that can be utilized to improve the performance of the classifiers utilized by the mobile robot 100.

Figure 7:
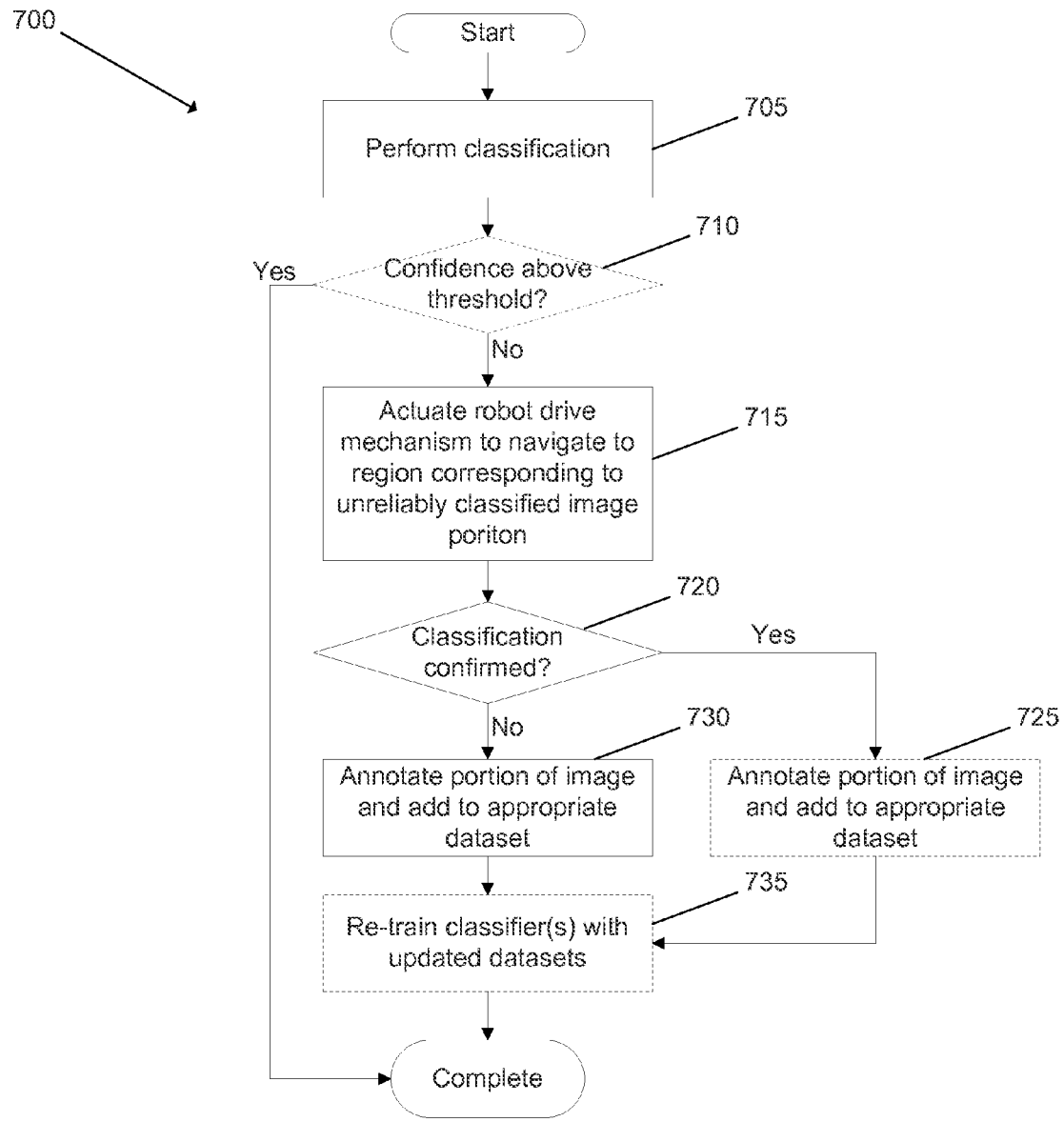
FIG. 7 is a flow chart illustrating a process for seeking out ground truth information based upon confidence metrics generated by one or more classifiers.

A process for seeking ground truths for portions of captured images for which a classifier provides classifications of varying reliability in accordance with embodiments of invention is illustrated in FIG. 7. The process 700 involves classifying (705) the content of a captured image using one or more classifiers. Processes similar to those outlined above can be utilized to perform the classification. A confidence score generated by the one or more classifiers can be analyzed to determine (710) the reliability of the classification(s). The manner in which a confidence score is generated typically depends upon the nature of the classifier utilized to perform the classification. In many classifiers, classification involves the use of similarity measure and the computed value of the similarity measure can form the basis of the confidence score. Additional factors can also be utilized in determining confidence scores including (but not limited to) a measure of the distance to the portion of the scene classified by the mobile robot, the amount of training data available to the mobile robot, the consistency of the classification with classifications made in the same region. In several embodiments, the confidence scores may be set on a numerical scale such as a number between 0 and 1 and a confidence score of 1 would indicate that the classifier is absolutely (e.g., 100%) certain with respect to its classification of the portion of image. In several embodiments, the confidence score can include multiple confidence metrics. In a number of embodiments, a threshold is applied to the confidence scores and confidence scores below the threshold may impact mobile robot 100 behavior. For example, a low confidence output (i.e. a confidence score below a threshold) from a classifier designed to identify obstacles and/or non-traversable floor may cause a mobile robot 100 to reduce its speed unnecessarily because it falsely identifies traversable floor as non-floor. Depending on the state of the mobile robot 100, the low confidence score may activate a behavior in which the mobile robot 100 seeks out ground truth with respect to the region of the operating environment corresponding to the portion of the image provided as an input to the one or more classifiers. In this way, the mobile robot 100 may prioritize collecting additional data used to annotate images for the training and/or improvement of its classifier (s) over other possible behaviors. When the process determines (710) that the confidence scores for portions of the captured image are above certain thresholds, the process completes.

In the illustrated embodiment, the identification (710) of a low confidence classification can result in the actuation (715) of the mobile robot 100 drive mechanism in order to navigate the mobile robot 100 to the region of the operating environment corresponding to the portion of the image provided as an input to the one or more classifiers. The mobile robot 100 can then utilize its sensors to establish ground truth for the region and attempt to verify (720) the original classification. When the classification is confirmed, the relevant image(s) and/or image portions can be annotated (730) and added to the appropriate dataset. Similarly, when the classification is proven to be false, the relevant image(s) and/or image portions can be annotated (740) and added to the appropriate dataset.

In embodiments where the mobile robot 100 utilizes annotated images to retrain the classifiers, the addition of the annotated image(s) and/or image portion(s) to the training data set can prompt the mobile robot 100 to initiate a process that retrains (735) the one or more classifiers utilizing the additional training data. The additional training data can also be used to retrain (735) the one or more classifiers based upon a schedule and/or as otherwise determined by the mobile robot 100.

Although specific processes for establishing ground truth and annotating images and/or image portions based upon confidence scores generated by classifiers are described above with reference to FIG. 7, any of a variety of processes may be utilized for establishing ground truth for captured images based upon the identification of a need for ground truth information in order to improve the performance of a classifier as appropriate to the requirements of specific applications in accordance with embodiments of the invention.

Mapping the Operating Environment

In some embodiments, a mobile robot 100 can utilize simultaneous location and mapping (SLAM) techniques in order to map the environment in which the mobile robot 100 operates. Furthermore, many embodiments supplement the SLAM techniques with the machine vision sensor system of the mobile robot 100 in order to generate vision-based SLAM (V-SLAM) techniques. In V-SLAM, one or more cameras mounted on the mobile robot 100 obtain images of the environment surrounding the mobile robot 100 as the mobile robot 100 navigates through the environment. Then, using location information including (but not limited to) the pose of the mobile robot 100 during the capturing of the images, the images may be related to a map of the environment built using the SLAM techniques. The images thereby are used to help understand the characteristics of the environment in which the mobile robot 100 operates using techniques including (but not limited to) the use of classifiers in a manner similar to that outlined above. In several embodiments, captured images can be provided to at least one classifier and used to determine characteristics of regions in a map generated using V-SLAM including (but not limited to) whether different portions of the map corresponds to traversable floor or non-traversable floor (e.g., that an obstacle is present, such as a piece of furniture or a wall). Furthermore, when classifying images, the mobile robot 100 may utilize the V-SLAM generated map of the environment to help ascertain the characteristics of the environment being depicted by the image. For example, if a classifier detects an obstacle at a certain location based on an analysis of a newly captured image, the mobile robot 100 may confirm this classification by examining whether the map of the environment includes an annotation that indicates the presence of an obstacle. Furthermore, in a situation where conflicting results exist between a classification of a portion of an image and annotations associated with the region within the map of the environment, the mobile robot 100 may seek out the ground truth regarding the particular characteristics of the environment using a process similar to the processes described above with respect to FIG. 7.

Figure 8:
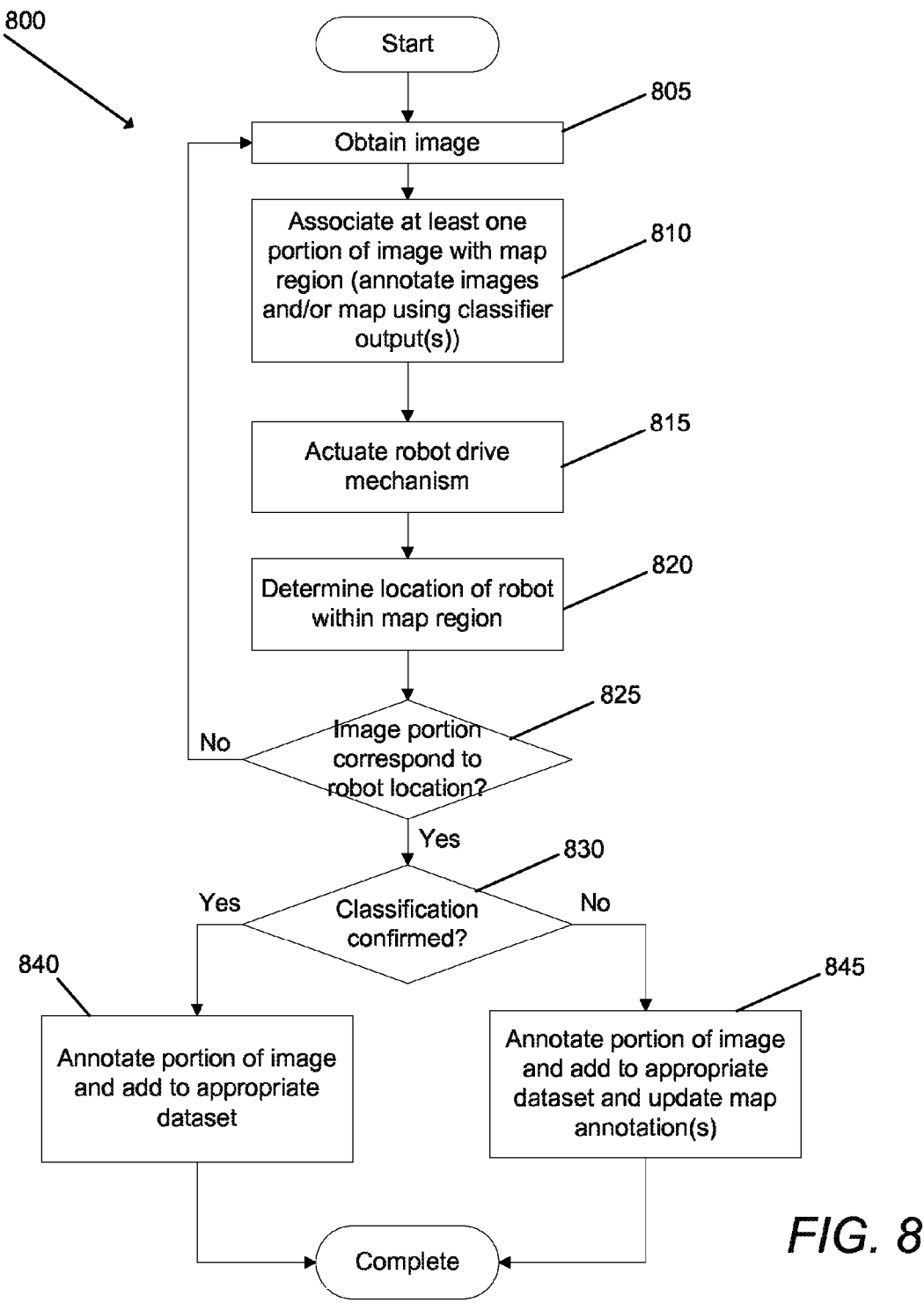
FIG. 8 is a flow chart illustrating a process for utilizing map information to determine correspondence between ground truth information and previously captured image data.

A process for acquiring ground truths for images associated with regions of maps generated using V-SLAM techniques in accordance with embodiments of the invention is illustrated in FIG. 8. The process (900) includes capturing (805) one or more images of an environment surrounding a mobile robot 100. In some embodiments, a captured image may also include various data describing different attributes of the image. In particular, some embodiments may store the pose of the mobile robot 100 at the time an image is captured and use this information when mapping the environment.

At least one portion of the captured image is associated (810) with a region of a map of the environment. In several embodiments, the map of the environment is maintained by a V-SLAM system. In other embodiments, a mobile robot 100 can generate and/or maintain a map of its operating environment using any of a variety of techniques. The process may use the metadata associated with a captured image to determine one or more regions of the map visible within the captured image. In a number of embodiments, one or more classifiers can be utilized to analyze the content of the captured image. In the many embodiments, the captured images are provided as an input to a classifier that can detect the presence of an obstacle and/or the distance to the obstacle. The location of obstacles identified by the classifier can be utilized to annotate the map maintained by the mobile robot 100 with information that can be utilized in subsequent route planning and/or navigation.

In several embodiments, the mobile robot 100 captures images as it moves and so the process 800 involves actuating (815) the mobile robot 100 drive mechanism in order to drive the mobile robot 100 through the environment. As the mobile robot 100 drives through the environment, the mobile robot 100 can continuously update its map(s) and/or determine its location within its map(s) of the environment. In several embodiments, a determination (820) can be made as to whether one or more captured images and/or image portions correspond to the robot's current map location. When no image(s) and/or image portion(s) contain a view of the region of the map currently occupied by the mobile robot 100, the mobile robot 100 can continue to navigate and/or acquire additional images.

When an image and/or image portion contains a view of the map region occupied by the mobile robot 100, the mobile robot 100 can capture ground truth using its sensor system. As described above, the mobile robot 100 sensors that identify non-floor may be, for example, any of the following or any combination of the following sensors mounted on the robot 100: a bumper 115 detecting a collision between the mobile robot 100 and a wall or other obstacle, an IMU detecting a tilt when the mobile robot 100 rides up on an object, odometers detecting wheel rotation without movement when a mobile robot 100 is high centered on an object, and/or an obstacle detection sensor, such an as IR emitter receiver proximity sensor, a laser, a lidar, a volumetric point cloud sensor, any time of flight sensor, a PIXART imaging sensor, a PRIMESENSE sensor, an RGBD sensor. When the image(s) and/or image portion(s) that contain a view of the map region occupied by the mobile robot 100 have been annotated by a classifier, the ground truth can be utilized to confirm (830) the classification. When the classification is confirmed, the image(s) and/or image portion(s) can be annotated (840) with ground truth and added to the appropriate training data set. Similarly, if the classification is determined to be false, then the image(s) and/or image portion(s) can be annotated (845) with ground truth and added to the appropriate annotated data set and the map annotations updated.

Although specific processes for annotating images with ground truths while utilizing processes, such as V-SLAM techniques, to maintain maps of the operating environment are described above with reference to FIG. 8, any of a variety of processes may be utilized to update annotated datasets to improve the performance of a classifier based upon associations between captured images and/or image portions and map regions as appropriate to the requirements of specific applications in accordance with embodiments of the invention. The manner in which a mobile robot 100 can determine distance to objects visible in captured images in accordance with various embodiments of the invention is discussed further below.

Analysis of Portions of Captured Images

Mobile robots in accordance with many embodiments of the invention can segment captured images into image portions and independently analyze the content of the image portions. In a number of embodiments, the machine vision sensor system of the mobile robot 100 can be calibrated to determine the pixels within captured images corresponding to different distances from a mobile robot 100 traversing a relatively horizontal floor. Using the calibration information, the mobile robot 100 can segment a captured image into different image portions and provide one or more of the image portions as inputs to one or more classifiers to determine the characteristics of the regions of the operating environment visible in each of the image portions.

Figure 9:
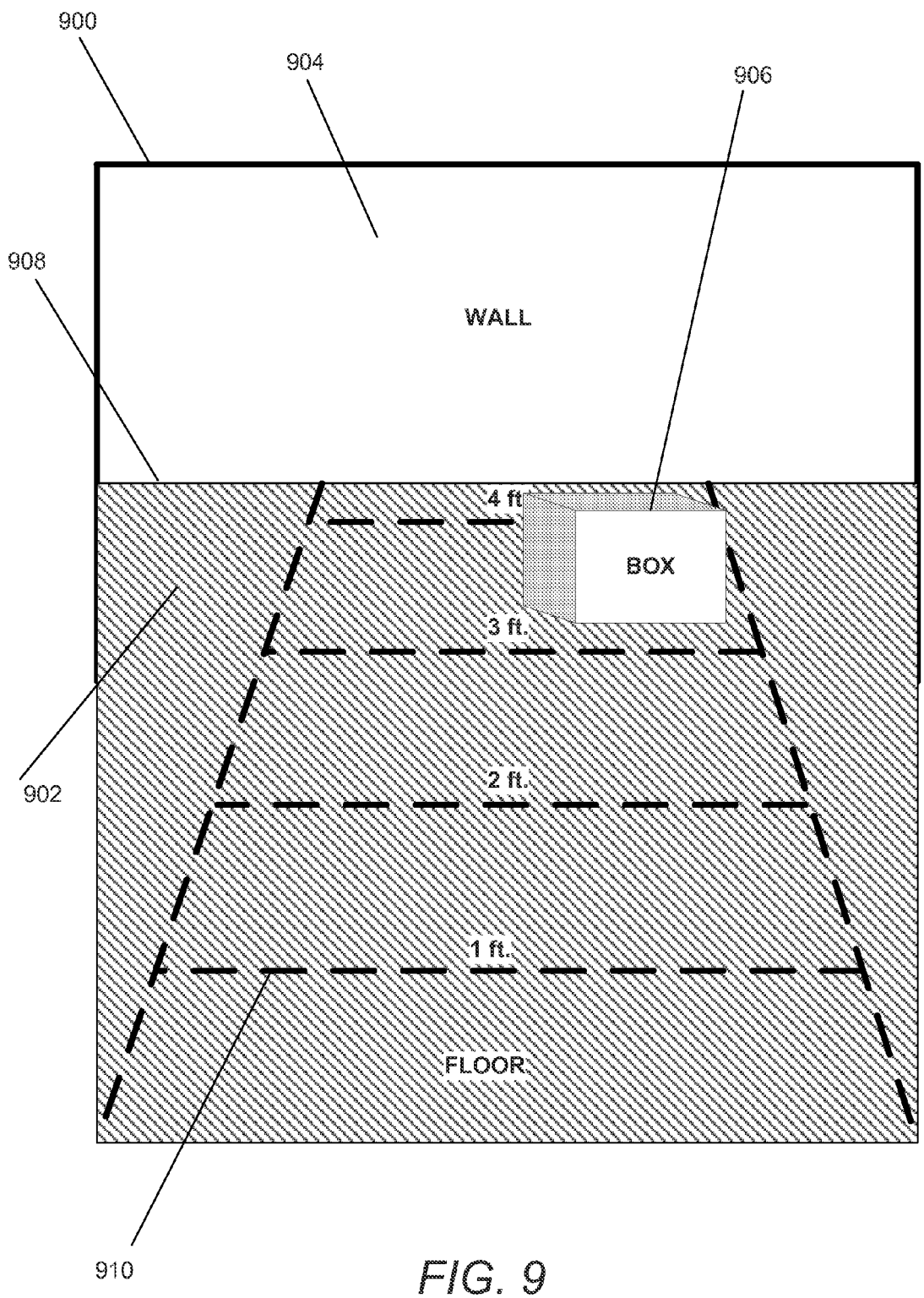
FIG. 9 conceptually illustrates the segmentation of an image into image portions that are separately provided to classifiers to obtain information concerning features present within the image and the distance to the detected features

A process involving segmentation of a captured image to analyze the content of the operating environment of a mobile robot 100 at different distances in accordance with an embodiment of the invention is conceptually illustrated in FIG. 9. The captured image 900 includes floor 902, a wall 904, and an obstacle 906. The floor 902 and the wall 904 define a horizon 908 and calibration information indicating the portions of the captured image corresponding to different distances from the robot are conceptually illustrated as ghost lines 910. In many embodiments, the mobile robot 100 can segment the image data in each portion of the image and provide the image portion as an input to one or more classifiers. In several embodiments, the image portions are provided to one or more classifiers specifically designed to classify image data at a specific distance (e.g. <1 ft.). In other embodiments, the image portions are provided to the same set of classifiers. By segmenting the input image into different image portions, the output of the classifier(s) not only provides information concerning the content of the image but also provide information concerning the distance from the mobile robot 100 for which the information is relevant. In this way, the mobile robot 100 can determine the presence of an object and/or non-traversable floor at a specified distance and route plan accordingly.

Although specific processes for determining distance to features of images identified and/or recognized by one or more classifiers maintained by mobile robot 100s are described above with respect to FIG. 9, any of a variety of techniques for determining distance to features visible within images including (but not limited to) the use of depth sensors and/or machine vision sensor systems that output depth maps can be utilized as appropriate to the requirements of specific applications in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. An autonomous mobile robot, comprising:
a drive configured to maneuver the autonomous mobile robot over a floor surface within an operating environment;
a camera having a field of view in a drive direction of the autonomous mobile robot;
a plurality of sensors configured to detect obstacles in the drive direction of the autonomous mobile robot;
a frame buffer configured to store image frames obtained by the camera while the mobile robot is driving, the image frames corresponding to portions of the operating environment;
a controller configured to maintain a map of the operating environment and associate metadata with a respective image frame obtained by the camera, the metadata comprising a time and pose of the autonomous mobile robot when the respective image frame was captured; and
a memory device configured to store a learned data set comprising a plurality of descriptors corresponding to pixel patches in the image frames, wherein one or more of the descriptors are updated based on sensor events indicative of one or more of the obstacles detected by the sensors that do not correspond with information in the image frames,
wherein the controller is configured to update the map with locations of the one or more of the obstacles in the portions of the operating environment that are indicated by the sensor events and do not correspond with the information in the image frames.

2. The autonomous mobile robot of claim 1, wherein the plurality of sensors comprises an imaging sensor.

3. The autonomous mobile robot of claim 1, wherein the plurality of sensors comprises an inertial measurement unit (IMU), an odometry sensor, a piezoelectric sensor, a structured light optical sensor, an infrared (IR) proximity sensor, a laser sensor, a lidar sensor, a volumetric point cloud sensor, a time of flight sensor, a PIXART imaging sensor, a PRIMESENSE sensor, and/or an RGBD sensor.

4. The autonomous mobile robot of claim 1, wherein the controller is configured to generate the map of the operating environment using visual simultaneous localization and mapping (VSLAM) based on the image frames.

5. The autonomous mobile robot of claim 1, wherein the controller is further configured to identify different angles of the operating environment from the map and execute a retraining process for one or more classifiers of the learned data set based on the different angles.

6. The autonomous mobile robot of claim 5, wherein the controller is configured to execute the retraining process for the one or more classifiers of the learned data set based on a time of day.

7. The autonomous mobile robot of claim 6, wherein the controller is further configured to track movement of one of the pixel patches through a plurality of the image frames based on movement of the autonomous mobile robot, wherein the one of the pixel patches comprises sunlight moving across the floor surface.

8. The autonomous mobile robot of claim 1, wherein the camera comprises one or more cameras mounted on a top and/or bottom of the autonomous mobile robot.

9. The autonomous mobile robot of claim 1, wherein the autonomous mobile robot further comprises an input/output interface that is configured to wirelessly communicate with at least one remote computing device.

10. The autonomous mobile robot of claim 1, wherein the controller is further configured to continuously update the descriptors of the learned data set based on subsequent image frames obtained by the camera, and execute a retraining process for one or more classifiers of the learned data set responsive thereto.

11. The autonomous mobile robot of claim 1, wherein controller is further configured to:
track a location as traversable floor based on the plurality of descriptors, wherein the autonomous mobile robot is configured to detect traversable floor and non-traversable non-floor with one or more of the sensors;

determine that the location is non-traversable non-floor based on a sensor event detected at the location;

retrieve, from the frame buffer, an image frame captured immediately prior to the sensor event;

generate a non-floor descriptor corresponding to the location in the image frame captured immediately prior to the sensor event, wherein the image frame captured immediately prior to the sensor event has a pose of the autonomous mobile robot associated therewith; and store the non-floor descriptor in the learned data set.

12. The autonomous mobile robot of claim 11, wherein the camera has a field of view including a portion of the floor surface, and wherein the controller is further configured to:

generate the non-floor descriptor corresponding to characteristics of the non-traversable non-floor at a top of the image frame captured immediately prior to the sensor event;

generate a floor descriptor corresponding to characteristics of the floor surface at a bottom of the image frame captured immediately prior to the sensor event; and store the floor descriptor and the non-floor descriptor in the learned data set.

13. The autonomous mobile robot of claim 1, wherein the controller is further configured to:

track a location as non-traversable non-floor based on the plurality of descriptors, wherein the autonomous mobile robot is configured to detect traversable floor and non-traversable non-floor with one or more of the sensors;

determine that the location is traversable floor after traveling a distance to the location and not detecting a sensor event at the location;

generate a floor descriptor corresponding to the location within one of the image frames having a pose of the autonomous mobile robot associated therewith; and store the floor descriptor in the learned data set.

14. A method of operating an autonomous mobile robot, the method comprising:

maneuvering, by a drive system, the autonomous mobile robot over a floor surface within an operating environment;

obtaining, by a camera having a field of view in a drive direction of the autonomous mobile robot, a plurality of image frames corresponding to portions of the operating environment;

storing the image frames in a frame buffer;

detecting, by a plurality of sensors, one or more obstacles in the drive direction of the autonomous mobile robot;

maintaining, by a controller, a map of the operating environment and associating metadata with a respective image frame obtained by the camera, the metadata comprising a time and pose of the autonomous mobile robot when the respective image frame was captured;

storing, in a memory device, a learned data set comprising a plurality of descriptors corresponding to pixel patches in the image frames, wherein one or more of the descriptors are updated based on sensor events indicative of one or more of the obstacles detected by the sensors that do not correspond with information in the image frames; and updating the map with locations of the one or more of the obstacles in the portions of the operating environment that are indicated by the sensor events and do not correspond with the information in the image frames.

15. The method of claim 14, further comprising:

identifying, by the controller, different angles of the operating environment from the map; and executing, by the controller, a retraining process for one or more classifiers of the learned data set based on the different angles.

16. The method of claim 15, wherein executing the retraining process for the one or more classifiers of the learned data set is further based on a time of day.

17. The method of claim 16, further comprising:

tracking, by the controller, movement of one of the pixel patches through a plurality of the image frames based on movement of the autonomous mobile robot, wherein the one of the pixel patches comprises sunlight moving across the floor surface.

18. The method of claim 14, wherein the plurality of sensors comprises an inertial measurement unit (IMU), an odometry sensor, a piezoelectric sensor, a structured light optical sensor, an infrared (IR) proximity sensor, a laser sensor, a lidar sensor, a volumetric point cloud sensor, a time of flight sensor, a PIXART imaging sensor, a PRIMESENSE sensor, and/or an RGBD sensor.

19. The autonomous mobile robot of claim 1, wherein the controller is further configured to execute a retraining process for one or more classifiers of the learned data set using the one or more of the descriptors updated based on the sensor events.

20. The method of claim 14, further comprising:

executing, by the controller, a retraining process for one or more classifiers of the learned data set using the one or more of the descriptors updated based on the sensor events.

* * * * *

UNITED STATES PATENT AND TRADEMARK OFFICE
CERTIFICATE OF CORRECTION

| | | |
|---|---|---|
| PATENT NO. | : 9,836,653 B2 | Page 1 of 1 |
| APPLICATION NO. | : 15/473327 | |
| DATED | : December 5, 2017 | |
| INVENTOR(S) | : Mark S. Schnittman | |

It is certified that error appears in the above-identified patent and that said Letters Patent is hereby corrected as shown below:

In the Specification

Column 24, Line 45: Please correct "100" to read -- 10c --
Column 24, Line 61: Please correct "81130" to read -- S1130 --

Signed and Sealed this
Twenty-second Day of May, 2018

Andrei Iancu
*Director of the United States Patent and Trademark Office*